(12) United States Patent
Postman et al.

(10) Patent No.: US 9,443,050 B2
(45) Date of Patent: Sep. 13, 2016

(54) LOW-VOLTAGE SWING CIRCUIT MODIFICATIONS

(71) Applicants: Jacob Postman, Corvallis, OR (US); Patrick Yin Chiang, Sacramento, CA (US)

(72) Inventors: Jacob Postman, Corvallis, OR (US); Patrick Yin Chiang, Sacramento, CA (US)

(73) Assignee: Oregon State University, Corvallis, OR (US)

( * ) Notice: Subject to any disclaimer, the term of this patent is extended or adjusted under 35 U.S.C. 154(b) by 415 days.

(21) Appl. No.: 13/956,140

(22) Filed: Jul. 31, 2013

(65) Prior Publication Data

US 2014/0040843 A1 Feb. 6, 2014

Related U.S. Application Data

(60) Provisional application No. 61/678,536, filed on Aug. 1, 2012.

(51) Int. Cl.
G06F 17/50 (2006.01)

(52) U.S. Cl.
CPC ....... *G06F 17/5068* (2013.01); *G06F 17/5081* (2013.01); *G06F 17/5009* (2013.01); *G06F 17/5045* (2013.01); *G06F 17/5077* (2013.01); *G06F 2217/12* (2013.01)

(58) Field of Classification Search
None
See application file for complete search history.

(56) References Cited

U.S. PATENT DOCUMENTS

| | | |
|---|---|---|
| 5,459,673 A | 10/1995 | Carmean et al. |
| 6,279,142 B1 | 8/2001 | Bowen et al. |
| 6,331,793 B1 * | 12/2001 | Fletcher ................. G06F 7/506 327/51 |
| 6,560,752 B1 | 5/2003 | Alpert et al. |
| 6,591,407 B1 | 7/2003 | Kaufman et al. |
| 6,629,298 B1 | 9/2003 | Camporese et al. |
| 6,766,499 B1 | 7/2004 | Mbouombouo et al. |
| 6,850,089 B2 | 2/2005 | Huang et al. |
| 7,480,883 B2 | 1/2009 | Correale, Jr. et al. |
| 7,877,719 B2 | 1/2011 | He |
| 8,010,922 B2 | 8/2011 | Malgioglio et al. |
| 8,127,266 B1 | 2/2012 | Gupta et al. |
| 2006/0158220 A1 * | 7/2006 | Lane .................. H03K 19/0013 326/41 |
| 2007/0271543 A1 | 11/2007 | Alpert et al. |
| 2008/0238519 A1 * | 10/2008 | Kapoor ..................... G06F 1/04 327/297 |

OTHER PUBLICATIONS

Bae et al., "A 0.6pJ/b 3Gb/s/ch Transceiver in 0.18 μm cmos for 10mm On-Chip Interconnects," *ISCAS*, pp. 2861-2864 (2008).
Goska et al., "Hardware/software codesign for energy-efficient parallel computing," *IEEE Int'l Conf. for High Performance Computing Neworking Storage and Analysis*, 5 pp. (2011).
Ho et al., "High Speed and Low Energy Capacitively Driven On-Chip Wires," *IEEE Journal of Solid State Circuits*, vol. 43, No. 1, pp. 52-60 (Jan. 2008).

(Continued)

*Primary Examiner* — A. M. Thompson
(74) *Attorney, Agent, or Firm* — Klarquist Sparkman, LLP

(57) ABSTRACT

Electronic design automation (EDA) technologies are disclosed that analyze a circuit design for candidate low-voltage swing (LVS) modifications, report the impact of the candidate LVS modifications on circuit characteristics (such as area, timing and energy) and implement selected LVS modifications based on their impact on the circuit characteristics. Candidate LVS modifications comprise replacing existing standard low-voltage swing drivers and receivers, or inserting low-voltage swing drivers and receivers.

20 Claims, 17 Drawing Sheets

(56) References Cited

OTHER PUBLICATIONS

Kim et al., "A 4Gb/s/ch 356fJ/b 10mm equalized On-Chip Interconnect with Nonlinear Charge-Injecting Transmit Filter and Transimpedance Receiver in 90nm cmos," *IEEE Int'l Solid-State Circuits Conf., Digest of Technical Papers*, pp. 66-68 (Feb. 2009).
Krishna et al., "SWIFT: A SWing-reduced Interconnect for a Token-based Network-on-Chip in 90nm CMOS," *IEEE Int'l Conf. on Computer Design*, pp. 439-446 (2010).
Mensink et al., "A 0.28pf/b 2gb/s/ch transceiver in 90nm cmos for 10mm on-chip interconnects," *IEEE Solid-State Circuits Conf.*, pp. 412-413, 612 (Feb. 2007).
Pawlowski et al., "A 530mV 10-Lane SIMD Processor with Variation Resiliency in 45nm SOI," *IEEE Int'l Solid-State Circuits Conference*, pp. 492-494 (2012).
Postman et al., "A Survey Addressing On-Chip Interconnect: Energy and Reliability Considerations," *ISRN Electronics*, 9 pp. (Feb. 2012).
Postman, "Energy Efficient Communication Across On-Chip Wires in Digital CMOS," Dissertation, Oregon State University, 139 pp. (Jun. 2013).
Postman et al., "Energy-Efficient Transceiver Circuits for Short-Range On-Chip Interconnects," *IEEE Custom Integrated Circuits Conf.*, 4 pp. (Sep. 2011).
Postman et al., "SWIFT: A Low-Power Network-On-Chip Implementing the Token Flow Control Router Architecture With Swing-Reduced Interconnects," *IEEE Trans. On Very Large Scale Integration (VLSI) Systems*, pp. 1432-1446 (Aug. 2013).
Schinkel et al., "A 3-gb/s/ch Transceiver for 10-mm Uninterrupted RC-Limited Global On-Chip Interconnects," *IEEE Journal of Solid State Circuits*, vol. 41, No. 1, pp. 297-306 (Jan. 2006).
Schinkel et al., "Low-Power, High-Speed Transceivers for Network-on-Chip Communication," *IEEE Trans. On Very Large Scale Integration (VLSI) Systems*, vol. 17, No. 1, pp. 12-21 (Jan. 2009).
Zhang et al., "Low-Swing On-Chip Signaling Techniques: Effectiveness and Robustness," *IEEE Trans. On Very Large Scale Integration (VLSI) Systems*, vol. 8, No. 3, pp. 264-272 (Jun. 2000).

\* cited by examiner

LOW-VOLTAGE SWING CIRCUIT MODIFICATIONS

CROSS-REFERENCE TO RELATED APPLICATIONS

This application claims the benefit of U.S. Provisional Application No. 61/678,536, filed on Aug. 1, 2012, and entitled "LOW-VOLTAGE SWING CIRCUIT MODIFICATIONS", which is hereby incorporated herein by reference.

STATEMENT AS TO RIGHTS TO INVENTIONS MADE UNDER FEDERALLY SPONSORED RESEARCH OR DEVELOPMENT

This invention was made with Government support under Grant No. NSF-08593 awarded by the National Science Foundation. The Government has certain rights in this invention.

BACKGROUND

Electronic design automation (EDA) tools, or computer aided design (CAD) tools are used by designers of electronic circuits, and specifically integrated circuits (IC) to create representations of electronic gates (e.g., transistors) and the interconnects (e.g., electrical connection) between them. Commercially available EDA tools allow designers to construct circuit layouts using a computer, which reduces circuit design cost and time.

Modern digital IC designs expend significant energy through the charging and discharging of gate and wire capacitances. Gate capacitances have scaled down with each recent generation of transistor and integrated circuit fabrication technology at a faster rate than wire capacitances. The discrepancy in the rate of capacitance scaling between gate and wire capacitances has resulted in a greater proportion of a typical design's energy being expended in charging the wires of IC designs than in previous technology generations and this trend is expected to continue.

Additionally, the performance of modern digital IC designs can be limited by the speed at which a wire can be charged and discharged by digital complementary metal oxide semiconductor (CMOS) devices that drive an output signal at conventional full digital voltage swing levels. This involves charging a capacitance inclusive of wire and gate capacitances substantially to the voltage of the attached power supply and discharging the same capacitance substantially to ground.

SUMMARY

This Summary is provided to introduce a selection of concepts, in a simplified form, that are further described hereafter in the Detailed Description. This Summary is not intended to identify key features or essential features of the claimed subject matter nor is it intended to be used to limit the scope of the claimed subject matter.

Described herein are technologies that analyze and process a circuit design, such as a digital CMOS design, report characteristics of analyzed designs and aid in implementing an improved version of the circuit design by automating the addition of low-voltage swing signaling circuitry to the original design.

In one embodiment, an electronic design automation and electronic design analysis tool analyzes a set of digital complementary metal oxide semiconductor (CMOS) design files and produces a new version of the original design with improved energy consumption and/or improved performance.

In one embodiment of modifying a circuit design, replaceable sets (e.g., replaceable nets, drivers and/or receivers) in a circuit description are identified. The replaceable sets are associated with candidate low voltage swing (LVS) modifications to the circuit design. A candidate LVS modification can include replacing a digital driver and receiver cells in a replaceable set with functionally equivalent LVS cells, inserting an LVS driver cell to the output of an existing digital driver cell, or inserting LVS receiver cells to the input of existing digital receiver cells. The impact of implementing candidate LVS modifications on circuit design characteristics (area, power, energy, timing) are analyzed, and LVS modifications are selected from the candidate modifications for implementation based on the impact analysis. The circuit description is then modified to implement the selected LVS modifications.

The foregoing and other objects, features, and advantages of the disclosed technologies will become more apparent from the following detailed description, which proceeds with reference to the accompanying figures.

DETAILED DESCRIPTION

One method of reducing the energy expended in charging wire capacitances of digital ICs is to replace traditional full voltage swing digital CMOS circuitry with CMOS circuitry that performs the same logical function, but does so at a low-voltage swing. This can involve replacing digital circuitry driving a full voltage signal with a circuitry that drives a low-voltage signal or by inserting a low-voltage swing transmitter circuit at the output of the original digital driver circuitry. The digital gate receiving a signal can be replaced with a low-voltage swing receiver circuit or a low-voltage swing receiver circuit can be inserted in advance of the original digital receiver to provide a conversion from low-voltage swing to full voltage swing. Similarly, one method of reducing the latency of a signal on an IC is to replace the digital gate that is driving the signal with a low-latency low-voltage swing transmitter circuit and to replace the digital gate receiving the signal with a low-voltage swing receiver circuit. Various low-voltage swing circuits have been demonstrated as being effective for reducing the energy expended in wires on an IC and for reducing the latency of signaling on wires on an IC.

Technologies for improving integrated circuit designs, such as digital circuit designs, are described herein. In various embodiments, the disclosed technologies can analyze a digital complementary metal oxide semiconductor (CMOS) circuit design, report characteristics of input circuit design files describing the design, and generate a modified design that is functionally equivalent to the original design, but includes low-voltage swing (LVS) cells and nets in place of some of the original conventional (full voltage swing) cells and nets. The modified design can have improved performance (e.g., speed and/or power) over the original design. Modifications to the original design comprise the insertion of LVS cells and nets to the original design and the replacement of conventional cells and nets with LVS cells and nets.

As used herein, the term "low-voltage swing" refers to signals and corresponding nets and circuitry that swing over a voltage range less than the full available voltage range between ground and the primary logic or "core" power supply voltage, or other logic power supply voltages, if an integrated circuit has multiple logic power supply voltages.

Figure 1:
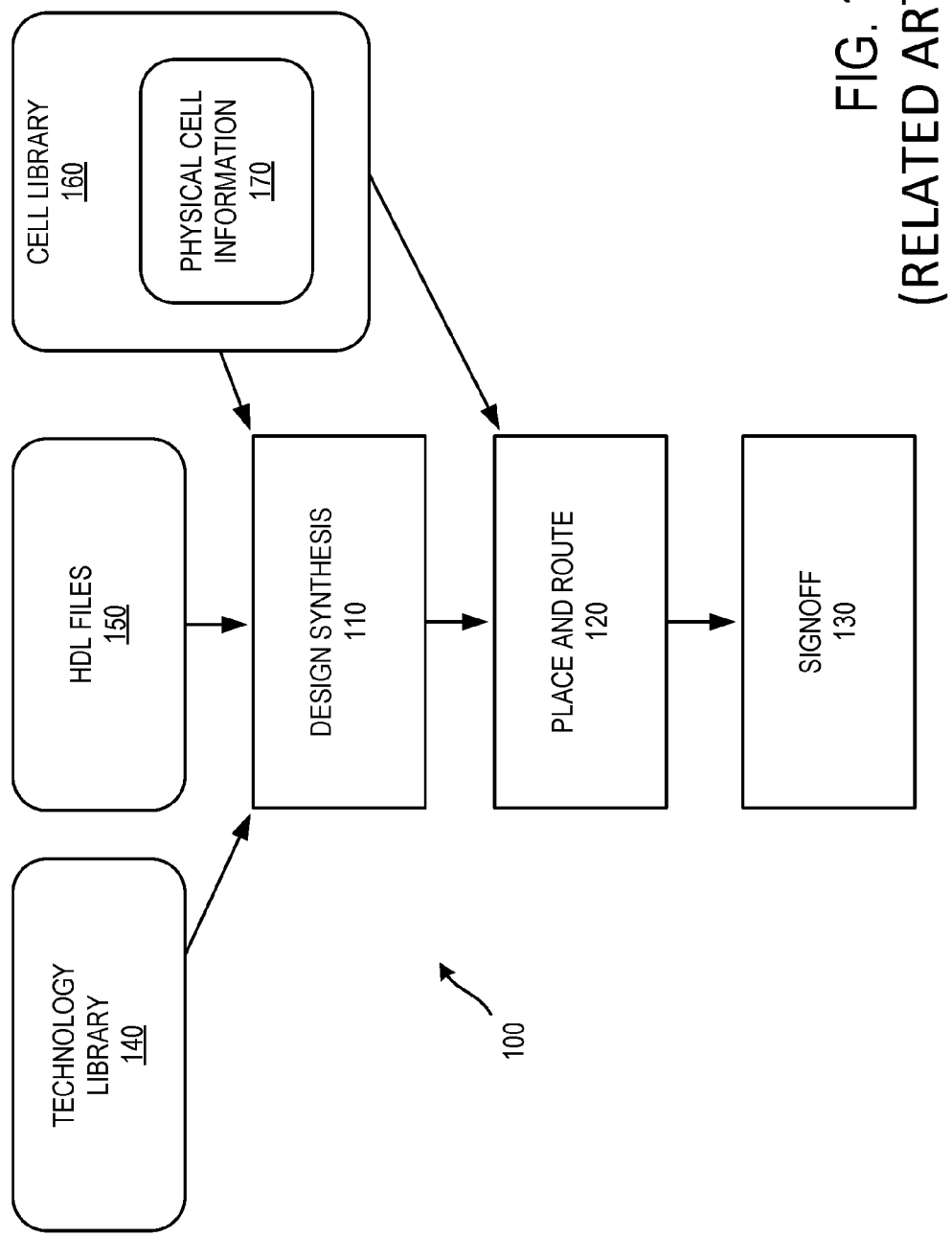
FIG. 1 is a block diagram of an integrated circuit (IC) design flow that can be used to generate an IC design from which a physical IC can be manufactured.

Turning now to the drawings, the technologies by which integrated circuit designs can be modified to include LVS circuitry are described. FIG. 1 is a block diagram of an integrated circuit (IC) design flow 100 that can be used to generate an IC design from which a physical IC can be manufactured. The design flow 100 comprises design synthesis 110, place and route 120 and signoff 130 processes. Inputs to the design flow 100 include a technology library 140, HDL design files 150 and cell libraries 160. The technology library 140 comprises information about the IC manufacturing process to be used to manufacture the design, such as transistor models and parasitic resistance and capacitance information. The HDL files 150 describe the IC design in a Hardware Description Language, such as Verilog, VHDL or C++. The HDL files 150 can comprise other high-level descriptions of an integrated circuit design. The HDL files 150 provide at least one description of a circuit (circuit description). Other circuit descriptions include netlist files that convey connectivity information for a circuit, physical design files indicating a circuit layout, and extracted parasitic information indicating parasitic resistances, capacitances and other parasitic elements extracted from a circuit layout.

The cell library 160 comprises various views (e.g., physical, timing, logical, schematic) of standard cells (e.g., inverters; AND, OR, XOR gates; adders, multipliers, shifters) available for use in a design to be manufactured with a particular process. The cell library 160 comprises physical cell information 170, which comprises layout information for the standard cells.

Design synthesis 110 translates the HDL description of an IC design into a lower-level technology-dependent description of the design, typically a netlist, based on information in the technology library 140 and the cell library 160. Place and route 120 generates a physical arrangement of the cells in the netlist and routes signal lines between the cells as well as power and ground nets. The physical design can then be verified to ensure compliance with timing, functional and other design goals, with signoff 130 of the design occurring when the design has been verified to meet the various design goals.

Figure 2:
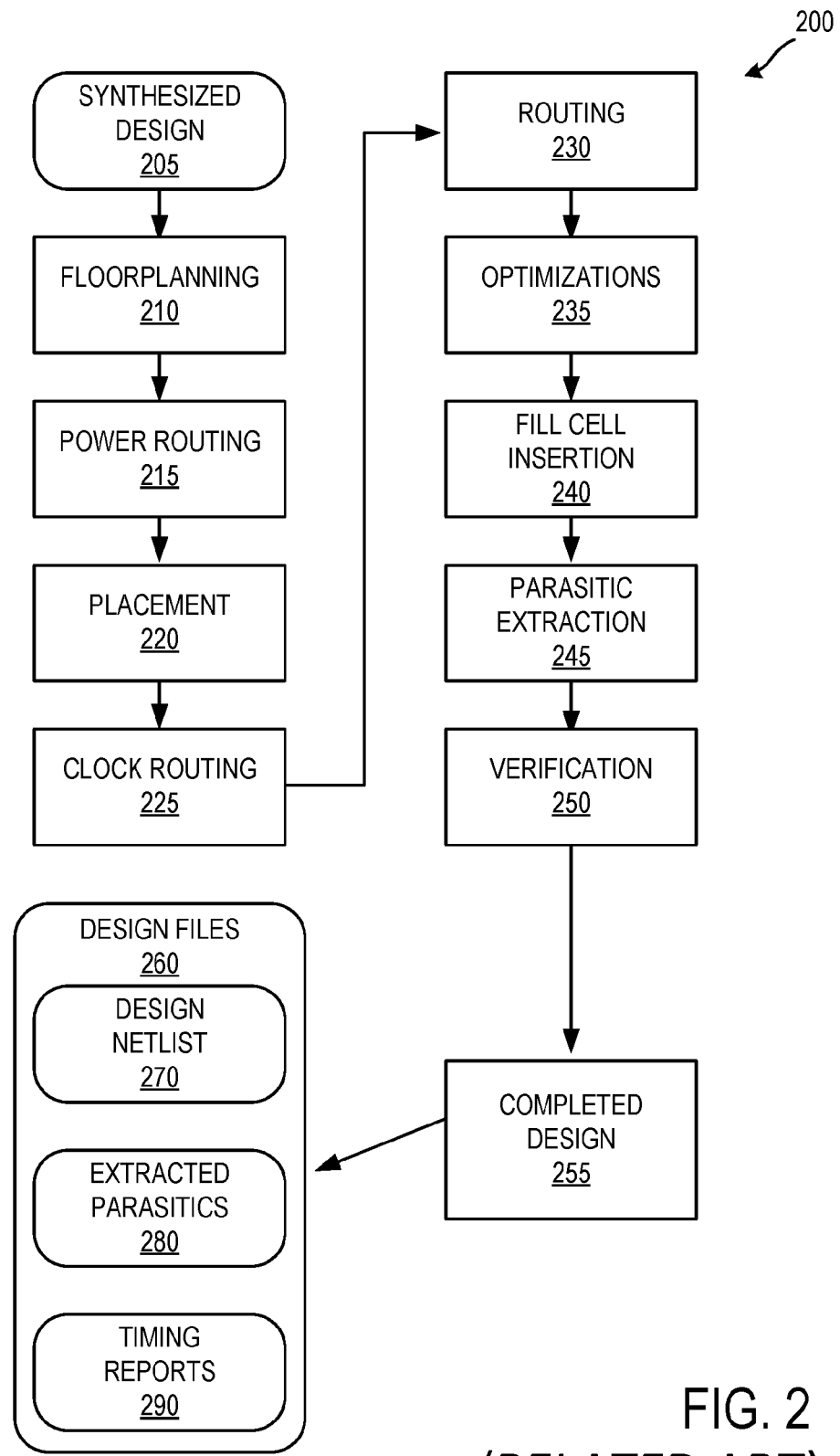
FIG. 2 is a block diagram of a conventional place and route stage of a conventional design flow.

FIG. 2 is a block diagram of a conventional place and route stage 200 of a conventional design flow. The place and route stage 200 produces design files that describe a physical IC design. The place and route stage 200 performs the following processes on a synthesized design 205: floor-planning 210, power routing 215, placement 220, clock routing 225, routing 230, optimizations 235, fill cell insertion 240, parasitic extraction 245 and verification 250. The output of the place and route process 200 is a completed design 255 described by design files 260: a design netlist 270, extracted parasitics file 280, and timing report files 290. In various embodiments, the design files 260 can comprise more or fewer files than those shown in FIG. 2. It is to be understood that FIGS. 1 and 2 and the related discussion present a high-level generalized view of a conventional IC design flow, the details of which are understood in the art and not discussed further here.

Figure 3:
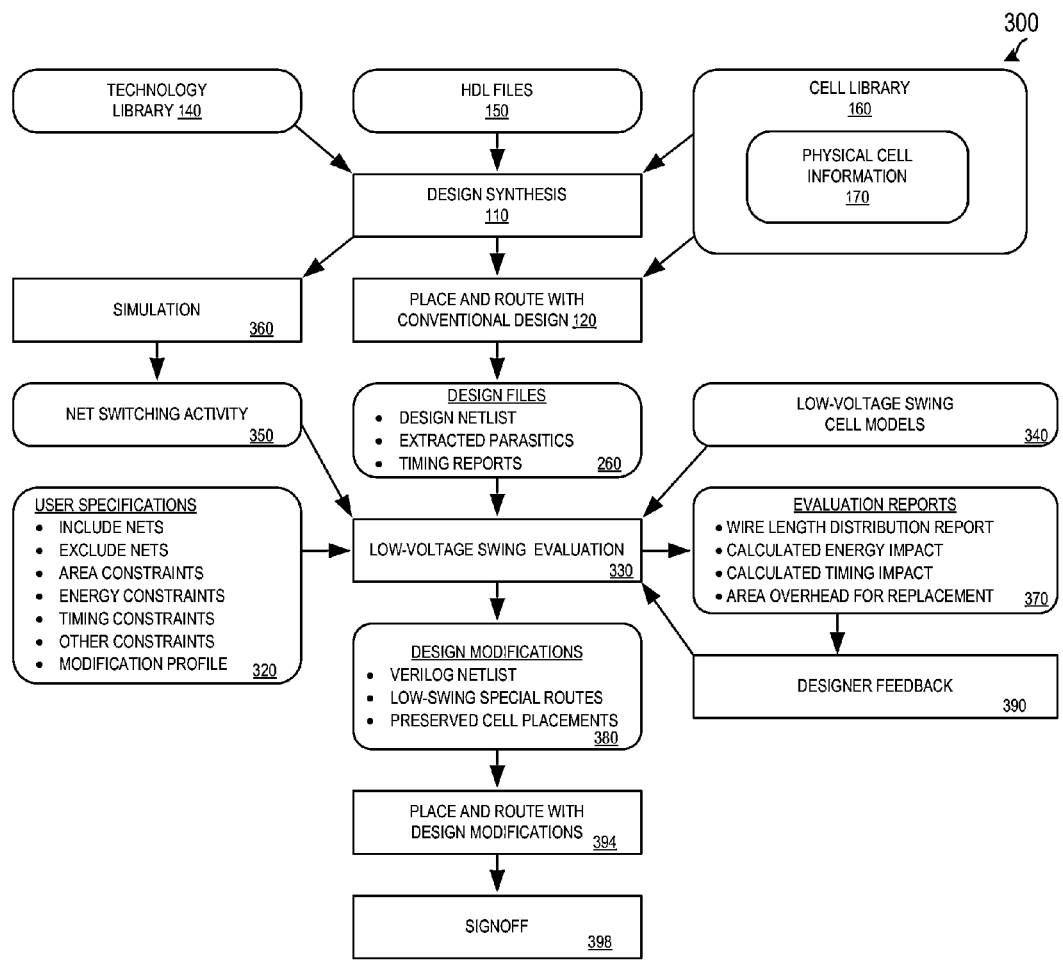
FIG. 3 is a block diagram of an exemplary design flow comprising the insertion of low-voltage swing circuitry into a circuit design.

FIG. 3 is a block diagram of an exemplary design flow 300 comprising the insertion of low-voltage swing circuitry into a circuit design. Typically, LVS circuitry introduced into an original design comprises LVS standard cells (LVS cells) belonging to an LVS library for a particular manufacturing process. However, the LVS circuitry incorporated in a design using the technologies described herein can comprise any LVS circuitry. For convenience, the term "LVS cells" refers to either LVS cells belonging to an LVS library, or any other LVS circuitry.

The design flow 300 can identify nets in an original design at which LVS cells can be inserted and replace existing digital driver and receiver cells. The modified circuit design can have improved performance over the original design while maintaining the functionality of the original design. As used herein, the term "LVS modification" or "low-voltage swing modification" refers to the insertion of LVS cells into an original design or the replacement of existing cells in an original design with LVS cells. The design flow 300 comprises the design synthesis 110 and place and route with the conventional design 120 processes; and the technology library 140, HDL files 150, cell library 160 and physical cell information 170 of FIG. 1. The place and route process 120 generates the design files 260.

The design flow 300 takes as additional input user specifications 320, which can comprise information indicating area, energy, timing and other design constraints, and priorities and trade-offs for design characteristics. The user specifications 320 can further comprise nets that are to be included in or excluded from the low-voltage swing evaluation 330. The priorities and trade-offs for design characteristics can be specified in a modification profile. For example, a modification profile can specify that timing improvements are to be prioritized over energy improvements. In a further example, a modification profile can specify that a certain amount of area increase is allowable if a timing, energy or other characteristic is improved by a corresponding amount. For instance, a modification profile can specify that the area of a design can increase by 10% if certain timing parameters improve by at least 10%.

The low-voltage swing evaluation 330 comprises identifying replaceable sets in a circuit design, identifying candidate low-voltage swing modifications for the replaceable sets, and analyzing the impact of implementing the candidate low-voltage swing modifications to the circuit design. The low-voltage swing evaluation 330 takes low-voltage swing cell models 340 and, optionally, net switching activity information 350 as inputs. The net switching activity 350 can be generated by a simulation process act 360, which comprises simulating a synthesized version of the circuit design (e.g., an output of the design synthesis 110). The low-voltage swing evaluation 330 generates evaluation reports 370. In general, the evaluation reports 370 comprise files, reports and visualizations that illustrate the impact of making LVS modifications to an original circuit. The evaluation reports 370 comprise a wire length distribution report, calculated energy and timing impact for modified nets in a design, and the impact of modified nets on design area. In other embodiments, the evaluation reports 370 can comprise more or fewer reports.

Additional outputs of the low-voltage swing evaluation 330 include design modifications 380. The design modifications 380 can comprise a HDL netlist (e.g., Verilog netlist) of a modified circuit design, that is, a version of the circuit design in which LVS circuitry has been inserted or in which LVS circuitry has replaced existing digital circuitry in the original design, low-voltage swing special routes (routes that are to be treated as "special" by the place and route tool) and a list of cells that have been preserved in the original design (e.g., cells that have not been replaced by LVS circuitry or to which LVS circuitry has not been added).

A designer can use the information provided in the evaluation reports 370 to provide designer feedback 390 to the low-voltage swing evaluation process 330 to control future iterations of the low-voltage swing evaluation 330. For example, the designer feedback 390 can comprise feedback indicating that LVS cells are not to be inserted at particular nets in the next design iteration. Typically, subsequent design iterations are based on the original design (the original design described by design files 260 and provided as input into the low-voltage swing evaluation 330). In a second place and route process 394, a physical representation of the modified design (the design as described by the design modifications 380) is produced.

The modified design includes LVS cells and can have improved energy, area, power, timing and/or other characteristics relative to the original design. Once design goals for the circuit have been met, the modified design is signed off at 398. Signoff 398 (or place and route 394) can comprise implementing one or more candidate LVS modifications. Implementing LVS modifications can comprise modifying netlists, physical design files, behavioral descriptions and other descriptions of the circuit design. It is to be understood that various processes of the design flow 300 can be iterated before the design is signed off. For example, a designer can run the low-voltage swing evaluation 330 repeatedly to explore how various LVS cell modifications impact energy-area or timing-area tradeoffs.

FIGS. 1-3 are now described in additional detail.

An integrated circuit design flow, such as the conventional design flow 100 illustrated in FIG. 1, can be utilized to produce input design file or files (e.g., design files 260) used by the disclosed technologies. A conventional design flow typically comprises converting a high-level circuit description, such as a behavioral (which could be written in SystemC, Verilog, SystemVerilog, VHDL or other behavioral language) or an RTL (which could be written in RTL Verilog or another RTL language) representation of a circuit design into a synthesized design comprising digital gates belonging to a standard cell library for a particular semiconductor manufacturing technology. The design files 260 describing the resulting physical design produced by a conventional design flow can be used as inputs to a design flow that generates a modified design comprising LVS circuitry that can have improved characteristics (e.g., timing and/or power) of the original design.

The cell library 160 can comprise timing files, such as liberty timing files (".lib" files) that comprise timing and power parameters for cells in the cell library. The timing files contain descriptions of design cell properties such as pins, pin functions, cell functions, timing arcs, power and/or cell areas. The cell library 160 can be read by a computing device configured to perform methods described herein, and stored in a data structure accessible to the computing device.

The HDL files 150 can be read by a computing device executing methods described herein. In various embodiments, the design structure described by the HDL files 150 is used to build two data structures that store connectivity information of nets and cells in the design. Net information is stored in a first data structure. Nets can be identified in the data structure using the flat net name from the original design. In embodiments where the HDL file 150 is a Verilog netlist, a flat net name can be constructed by concatenating the Verilog netlist's module hierarchy as a prefix to the net name (e.g., block0.register0.in). For a cell with an output pin connected to a net, the cell and pin connected to the net are added to a list of drivers for that net. For cells with an input pin connected to a given net, the cell and pin connected to the given net are added to a list of receivers for that net.

The extracted parasitic and routing information included in the design files 260 can be read by a computing device capable of executing methods described herein and placed into data structures accessible to the computing device. The extracted parasitic and routing information comprise parasitic information in any format, such as the standardized parasitic exchange format (SPEF) that can be produced in a conventional design flow by conventional place and route tools. The capacitance of wires for a net as contained in a parasitic file are associated with the net read from the HDL file 150, and the extracted capacitance is added as a property of that net. Likewise, the pin capacitance, which is typically extracted from the cell library 160, of the pins in the list of drivers and receivers connected to a net is summed and stored as a property of the net to which the pins are attached in the circuit design.

The second data structure can be constructed to contain properties of the cells in the design, such as cell name, cell type, a list of nets attached to pins in the cell, the capacitances of those pins and a cell identifier. Other cell properties can be stored in the second data structure as well. The cell identifier can comprise a flat cell instance name. A flat cell instance name can be created, for example, using the cell's instance name with a prefix constructed using the Verilog netlist's module hierarchy, similar to the methodology used for naming nets as described for the first data structure. In other embodiments, net and cell connectivity information can be stored in one or more data structures.

Before the effects of LVS cell replacement and insertion on the design's area, energy, power and/or delay properties can be analyzed, the circuit elements of the design that can be replaced by LVS circuitry are identified. In some embodiments, this identification can be done as part of a low-voltage swing evaluation (e.g., low-voltage swing evaluation 330) or it can be performed as a separate step in an IC design flow. The identification of circuit elements that can be replaced by LVS circuitry can comprise the identification of replaceable sets.

Figure 4:
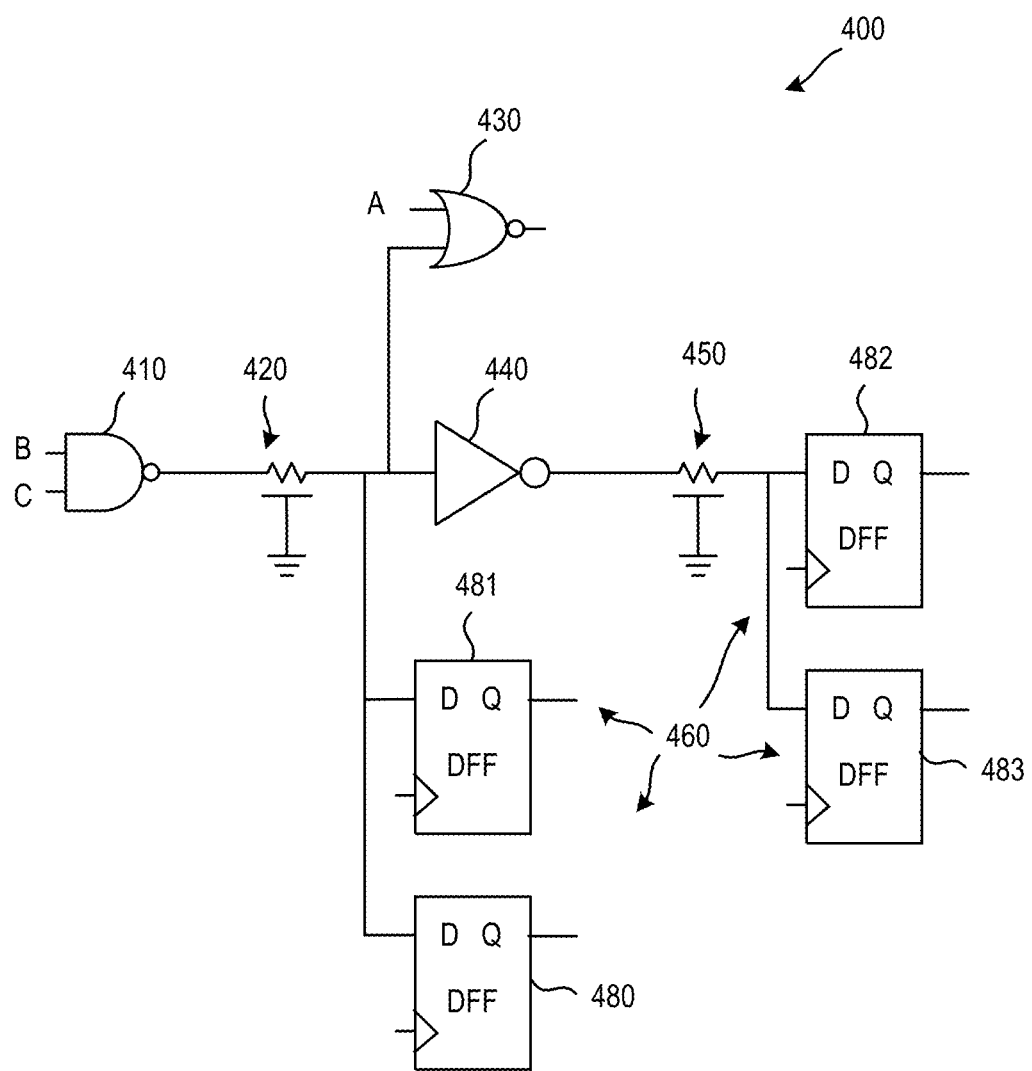
FIG. 4 is a schematic diagram of an exemplary replaceable set.

FIG. 4 is a schematic diagram 400 of a model of a first exemplary replaceable set. In general, a replaceable set comprises a collection of connected nets, drivers and receivers for which functionally equivalent low-voltage swing cells models are available (e.g., are part of low-voltage swing cell models 340). An originating driver in a replaceable set delivers a signal provided by one an output pin of the driver to an input pin or pins of one or more receiver cells, and can include one or more buffers or inverters located between the driver and the receivers. A replaceable set can also comprise a hierarchy of circuit elements. Thus, a replaceable set can comprise receiver cells that are directly driven by the output pin of an originating driver (e.g., receiver cells 480 and 481 that are directly driven by NAND driver 410) and receiver cells that are indirectly driven by an originating driver (e.g., receiver cells 482 and 483 that are indirectly driven by NAND driver 410 via inverter 440). The replaceable set shown in FIG. 4 comprises the originating NAND driver 410, the net 420, the inverter 440, the net 450 and the four D flip-flops (DFFs) 460. In some instances, a replaceable set can consist of a single driver cell, a single receiver cell and a connecting net wherein either or both cells are replaceable with a functionally equivalent low-voltage swing cell. In the diagram 400, if there is no model for a low-voltage swing cell NOR gate within available low-voltage swing cell libraries, then the NOR receiver 430 cannot be part of a replaceable set. If the available low-voltage swing cell libraries do contain a low-voltage swing cell NOR gate, then the NOR gate 430 can be part of a replaceable set.

Figure 5:
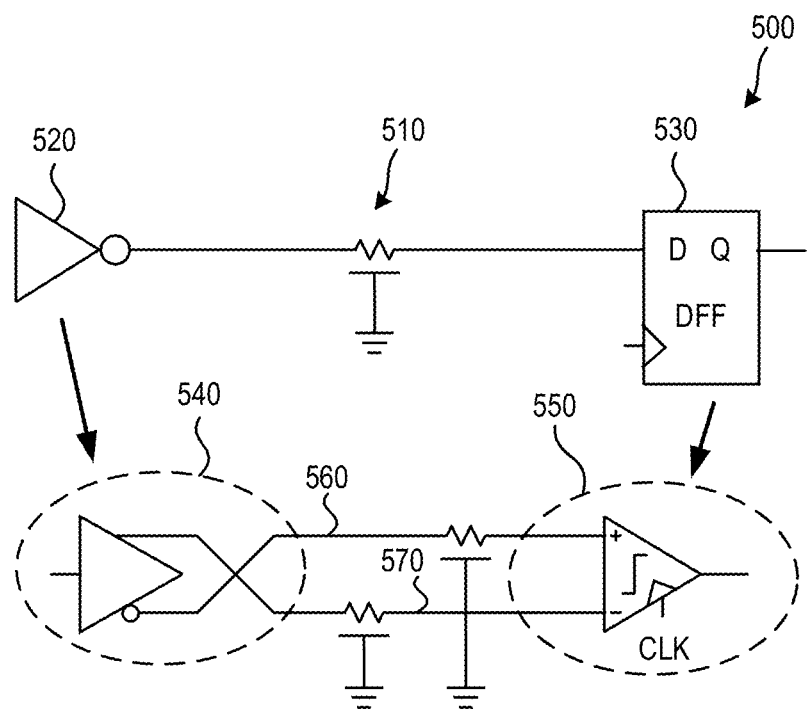
FIG. 5 is a schematic diagram of an exemplary replaceable set in which driver and receiver cells are replaced by low-voltage swing cells.

FIG. 5 is a schematic diagram 500 of an exemplary replaceable set in which driver and receiver cells are replaced by low-voltage swing cells. The exemplary replaceable set comprises a wire interconnect 510, inverter driver 520 and D flip-flop receiver 530. The corresponding low-voltage swing cell replacements comprise low-voltage swing driver cell 540 and low-voltage swing receiver cell 550. The net 510 is replaced by wires 560 and 570 that carry a low-voltage swing differential signal.

Figure 6:
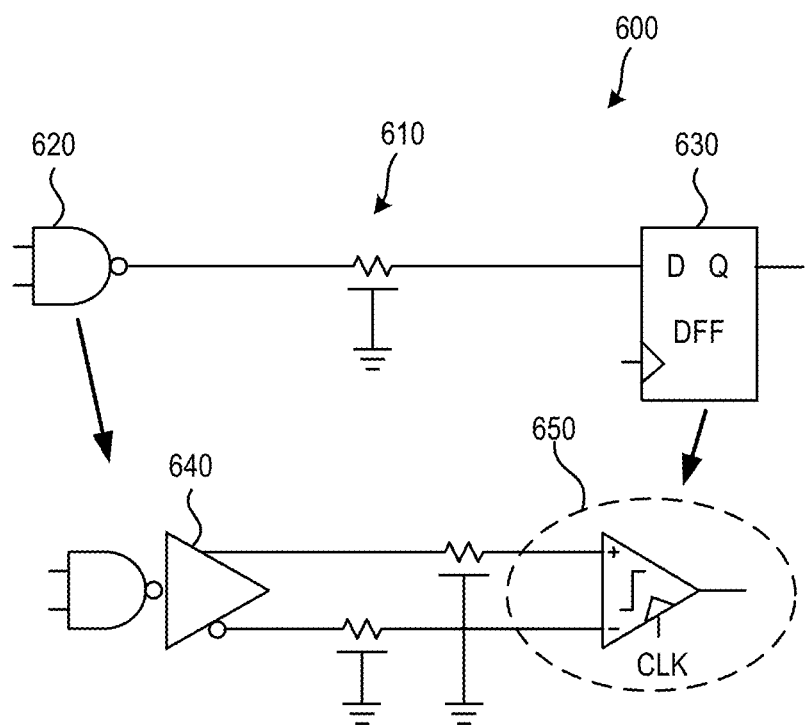
FIG. 6 is a schematic diagram of an exemplary replaceable set in which a low-voltage swing driver cell is inserted at the output of the original driver cell and a low-voltage swing receiver cell replaces the original receiver cell.

One circuit property that can be used to identify a replaceable set is that an originating driver cell can be replaced with either a low-voltage swing driver cell, as illustrated in FIG. 5, or accept a low-voltage swing driver cell at its output, as shown in FIG. 6. FIG. 6 is a schematic diagram 600 of an exemplary replaceable set in which a low-voltage swing driver cell 640 is inserted at the output of the original driver cell and a low-voltage swing receiver cell 650 replaces the original receiver cell. The replaceable set in the diagram 600 comprises a wire interconnect 610, an originating NAND driver 620, and a receiving D flip-flop receiver 630. The corresponding low-voltage swing cell insertion and replacement comprises a low-voltage swing driver cell 640 inserted at the output of the originating driver 620 and a low-voltage swing cell receiver 650 replacing the receiver 630.

Figure 7:
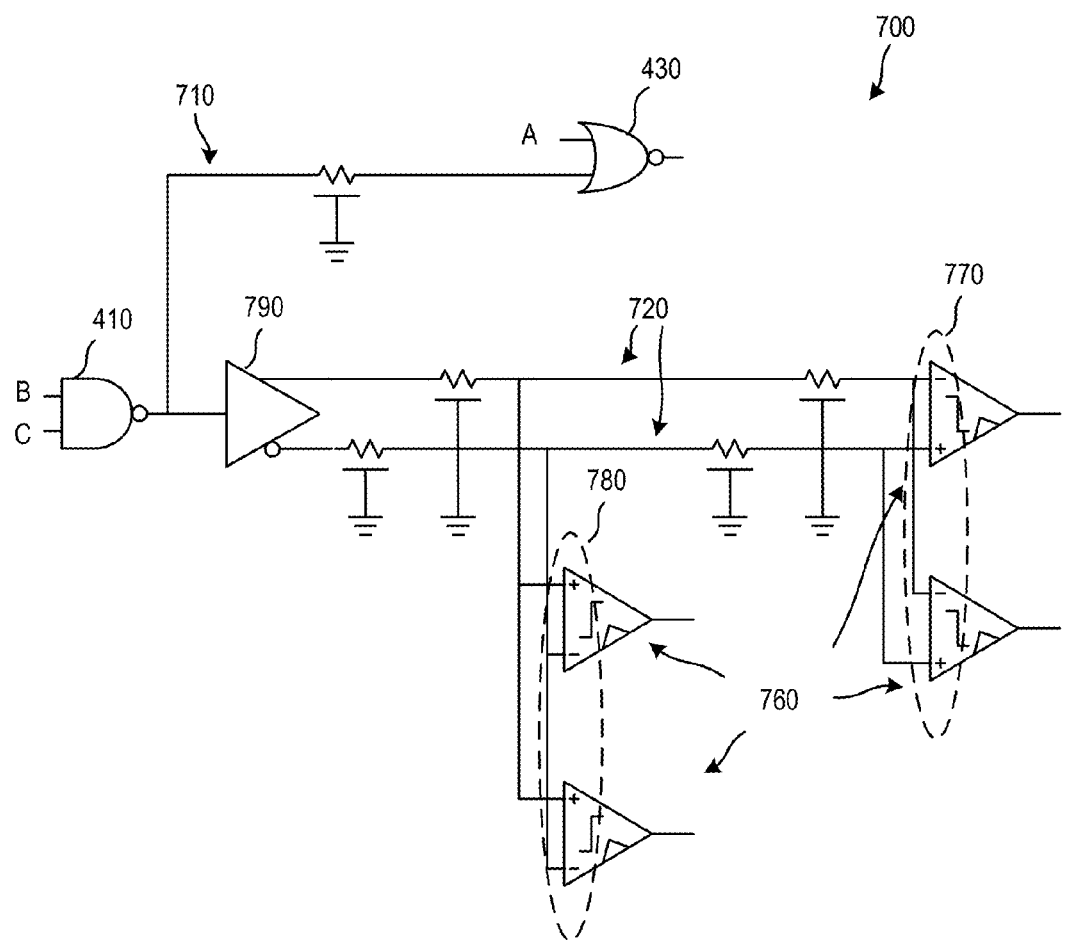
FIG. 7 is a schematic diagram illustrating the circuit of FIG. 4 after application of a first exemplary replacement procedure.

Another property that can be used to identify a replaceable set is that receiver cells of the set can be replaced with functionally equivalent cells with a low-voltage swing input or inputs. Determining whether a digital receiver cell is replaceable can comprise determining whether a low-voltage swing cell model for the original digital receiver is available to the IC design flow. FIG. 7 is a schematic diagram 700 illustrating the circuit of FIG. 4 after application of a first exemplary replacement procedure in which the D flip-flops 460 have been replaced with low-voltage swing receiving cells 760.

Yet another property that can be used to identify a replaceable set is that a buffer or inverter, if appearing between an originating driver and a receiver, can be removed from the design, resulting in the originating driver directly driving a receiver input pin. If the polarity of a signal is flipped between the originating driver and receiver by an inverter, this can be accounted for at the receiver input. For example, in diagram 700, the inverter 440 in FIG. 4 has been removed, and the differential net 720 is connected to receivers 770, inverted from the connection to the receivers 780. In alternative embodiments, buffers or inverter cells that utilize low-voltage swing inputs and outputs can be used to replace a full voltage swing digital cell that performs the same logical function at a conventional voltage swing.

In some cases, a simple replacement can be performed as shown in FIG. 5, wherein an inverter cell is replaced with a differential mode low-voltage swing transmitter (inverter 520 is replaced by LVS transmitter 540) and a flip-flop cell is replaced with a sense amplifier cell (D flip-flop 530 is replaced by sense amplifier 550, a differential mode low-voltage swing receiver cell). If a low-voltage swing cell library does not contain a functionally equivalent replacement for an original cell driving a net, the original driver cell is not replaceable. In such instances, a low-voltage swing driver cell can be added to the output of the original driver cell. For example, if there is no low-voltage swing cell equivalent to a digital NAND gate in a particular low-voltage cell library, a low-voltage swing transmitter can be added to the output of the NAND gate (e.g., the LVS transmitter 640 can be added to the NAND driver 620).

Figure 8:
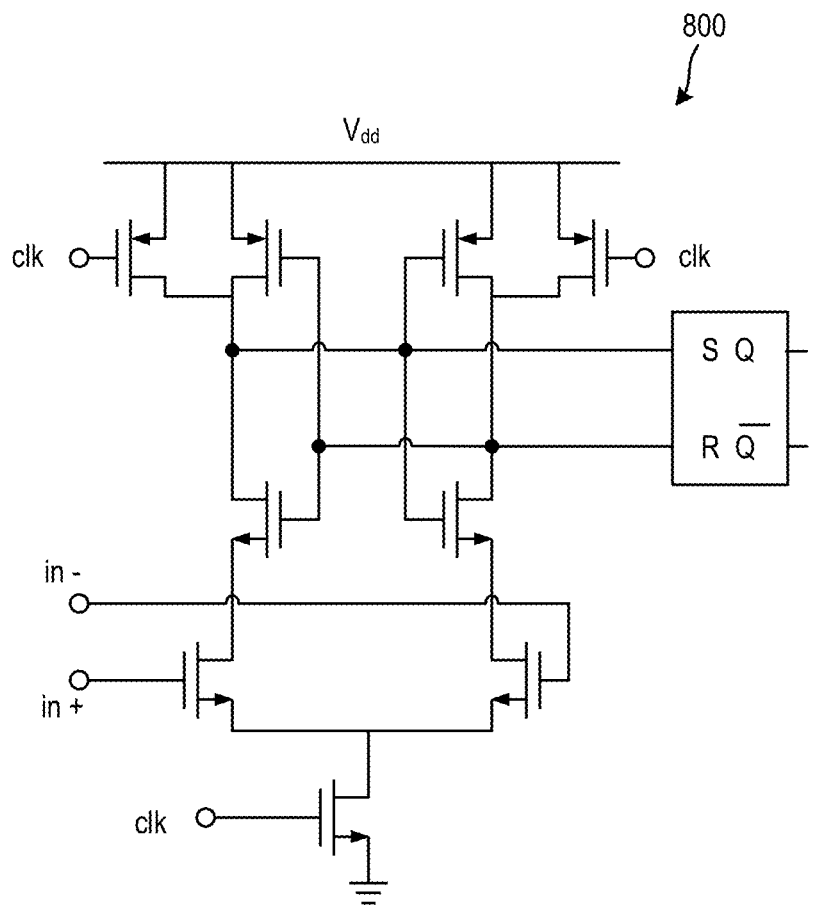
FIGS. 8 and 9 are schematic diagrams of an exemplary low-voltage swing signaling receiver and driver, respectively, that can be used by the technologies described herein.
Figure 9:
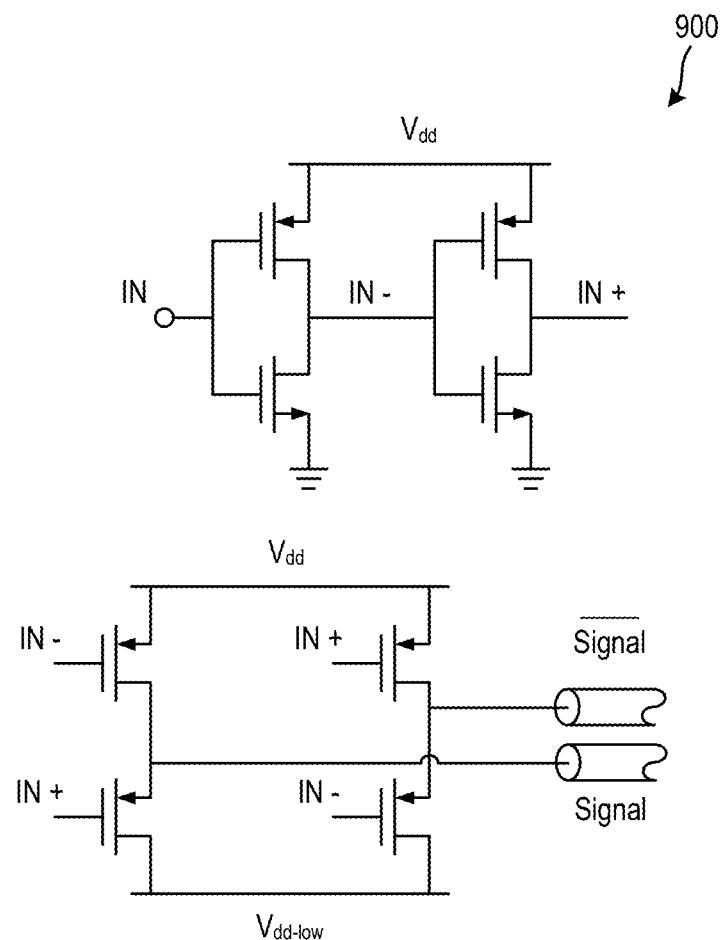

FIGS. 8 and 9 are schematic diagrams 800 and 900 of an exemplary low-voltage swing signaling receiver and driver, respectively, that can be used by the technologies described herein. The receiver 800 and driver 900 are only two examples of LVS cells that can be used in LVS circuit modifications. Various other low-voltage swing circuits or combinations thereof known in the art can be used by the technologies described herein.

Replaceable drivers and receivers connected by one or more inverters and/or buffers can be identified as part of a replaceable set as follows. In some embodiments, first, replaceable nets are identified. A net is a replaceable net if the net attaches to pins of replaceable receiver cells, and the net does not attach to pins of non-replaceable receiver cells (receiver cells that are not replaceable by LVS equivalents). For example, if the low-voltage swing receiver cell 800 is an LVS replacement for D flip-flops in an original design, a net and its associated receiver cells would be considered replaceable if the net is attached to D input pins of flip-flop cells in the original design (and the net is connected to input pins of other replaceable receiver cells). If the driver of a net that has been identified as replaceable is not a buffer or inverter cell, then the evaluation of that net is complete, the net is identified as a replaceable net, and a replaceable set is created that includes the driver cell, the replaceable net, and receiver cells attached to the net. The replaceable set is added to a list of replaceable sets.

If the driver of a replaceable net is a buffer or inverter, the structure of parent and sibling nets are checked. A parent net is the net that is attached to the inverter or buffer input. A sibling net is a net driven by an inverter or buffer other than the inverter or buffer driving the replaceable net and that is driven by the parent net. For example, with reference to FIG. 4, net 420 is the parent net of net 450 as net 420 drives the input of the inverter 440 that drives net 450. If the driver of a parent net is also a buffer or inverter, the parent of the parent net is evaluated as well. This process continues until a parent net is reached that does not have a buffer or inverter cell as its driver. This can be done by traversing a netlist until a parent net is found that is not driven by an inverter or buffer cell.

Once the top parent net is found, descendant nets of the top parent net that are driven by buffers or inverters are identified as replaceable child nets and are added to the appropriate replaceable set. In one embodiment, starting from the top parent net and iterating through children nets in a depth-first traversal, nets are analyzed to determine if they are replaceable child nets. If a child net of a current net being analyzed is replaceable and the current net is not replaceable, then the buffer cell driving the child net is marked as a potential top parent driver cell of a replaceable set. If a child net is replaceable and the current net is also replaceable, the buffer cell is marked for removal and the current and child nets can be considered part of the same replaceable set. Multiple buffers or inverters connected in series (serially connected inverters and/or buffers) can be marked for removal if a parent's grandchild net (or descendant nets further removed from the parent) are replaceable. If a child net is not replaceable, then the current net is also marked as not replaceable.

During the depth-first traversal, if a current net is not connected to a buffer, inverter, or the D-pin of a flip-flop, then the current net can be marked as not valid for replacement, or components of the net can be separated into two new nets. If components of the net are separated, the net can be split into two nets: a first replaceable net connected to replaceable components and a second net connected to at least one non-replaceable component. For example, net 420 in FIG. 4, which has NOR gate 430 as a receiver, can be split into two new nets, as shown in FIG. 7. One of the new nets is non-replaceable net 710, which connects NAND driver cell 410 to the non-replaceable NOR receiver cell 430. The remaining circuit elements connected to net 420 are added to replaceable net 720 in FIG. 7 through the insertion of an LVS buffer cell 790 and removal of inverter 440.

Figure 10:
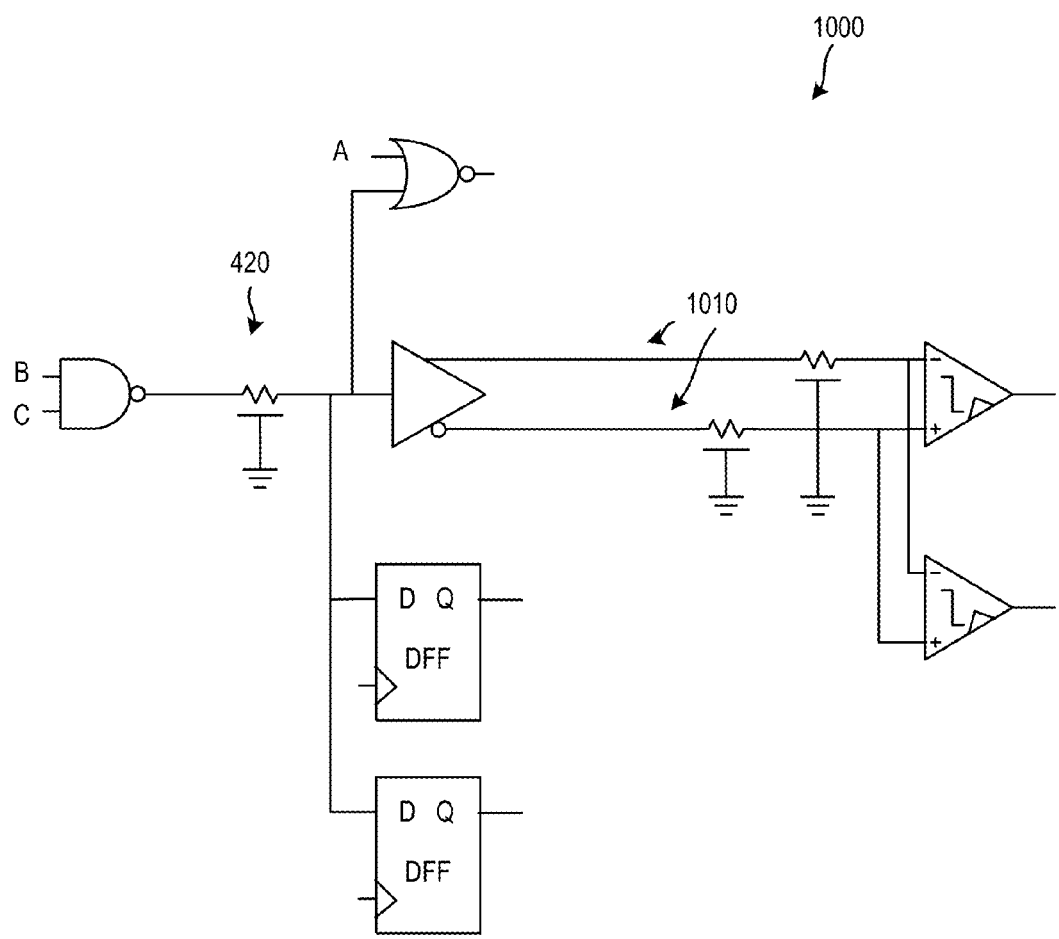
FIG. 10 is a schematic diagram illustrating the circuit of FIG. 4 after application of a second exemplary replacement procedure.

FIG. 10 is a schematic diagram 1000 illustrating the circuit shown FIG. 4 after application of a second exemplary replacement procedure, in which nets that have at least one non-replaceable receiver are not marked for replacement. In the diagram 1000, net 420 has not been replaced and net 450 has been replaced with differential net 1010.

After identification of replaceable sets, one or more candidate LVS modifications to the replaceable set are identified and analyzed. This identification and analysis can be part of the low-voltage swing evaluation 330 in the design flow 300. Replaceable set analyses include analyzing and predicting the impact on energy, timing and/or other circuit characteristics if the candidate LVS modifications were implemented.

As part of analyzing the candidate LVS modifications that can be applied to the identified replaceable sets, the total capacitance of an original net, which comprises wire capacitance and pin capacitances of pins attached to the net is determined. In some embodiments, replaceable set analysis can comprise comparing energy and timing models of the original cells and nets of a replaceable set with replaceable cells comprising an LVS modification to determine the impact of implementing a particular candidate LVS modification on timing and energy characteristics. In various embodiments, replaceable set analysis can comprise performing dynamic timing analyses, such as performing SPICE simulations.

In some embodiments, estimates of dynamic switching energy and static leakage power expenditure for a replaceable set can be calculated using the set's capacitance and associated cell power data contained within extracted parasitic (e.g., SPEF or equivalent) and timing (e.g., liberty timing or equivalent) files. In some embodiments, the energy per cycle, or power consumption if the operating frequency is known, of a set as a fraction of the total design energy per cycle or power can be calculated as part of analyzing the replaceable nets. In these embodiments, data on the switching activity (e.g., net switching activity 350) of replaceable nets can be produced by simulating the synthesized, gate-level design.

For example, with reference to FIG. 3, a synthesized, gate-level design produced by the design synthesis process 110 can be simulated in a simulation process 360 to produce net switch activity information 350 that can be applied to individual replaceable sets to calculate the energy per cycle or power expenditure of a particular net or set of nets as a fraction of the total design energy/cycle or power. Consideration of net switching activity can allow a designer to more accurately determine the value of implementing a candidate LVS modification by improving the accuracy of a cost-benefit analysis associated with a possible LVS modification.

As a result, candidate LVS cell insertions and replacements can be prioritized by the amount they improve the characteristic (e.g., timing, energy, power, area) of a design given specified design constraints. For example, if two otherwise identical net/cell sets being considered for an LVS modification are compared, with one having a higher switching activity rate than the other, the set with the higher switching activity rate can provide a greater power reduction for the same cost of replacement, and can be identified as a higher-priority set for LVS modification. In another example, if a limited allowable area increase is defined for an LVS cell insertion/replacement process, the candidate LVS modification can be prioritized based on the amount of timing, energy or other benefit the LVS modification provides for a set cost (the limited allowable area increase).

Although nets have been described as being replaceable if they have inverters, buffers or D input pins of flip-flops as receivers, in other embodiments, nets having additional types of receivers can be identified as replaceable. For example, if a low-voltage swing cell library comprises models for NAND or NOR gates, nets having NAND or NOR gates as receivers can be identified as replaceable nets. In addition, replaceable nets and sets can be identified by traversing a design in a depth-first or any other manner. Further, a netlist can be exhaustively traversed, or alternatively, a netlist can be partially traversed to identify replaceable nets. For example, a user can specify that only certain blocks of a design are to be searched, or that certain blocks are not to be searched. This information can be provided to the design flow via, for example, user specifications 320.

After candidate LVS modifications are identified, their effect on the design is evaluated as part of the low-voltage swing evaluation 330. Report documents (e.g., evaluation reports 370) are produced that report the predicted effect of the candidate LVS modifications that can be made to the design. Effects of these design changes on the design area, energy consumption, power consumption, timing and any other design characteristics are reported. These reports can enable a designer to select which modifications to apply to the design via designer feedback 390 or user specification 320 that specify which modifications to make based on chosen priorities of energy, area, timing and any other design constraints. For example, in an initial low-voltage swing evaluation 330, a designer can choose a modification profile in which timing improvements are prioritized. After running an initial evaluation 330 and reviewing the expected timing improvements in the evaluation reports, a designer can select a different modification profile that places less priority on timing improvements.

Figure 11:
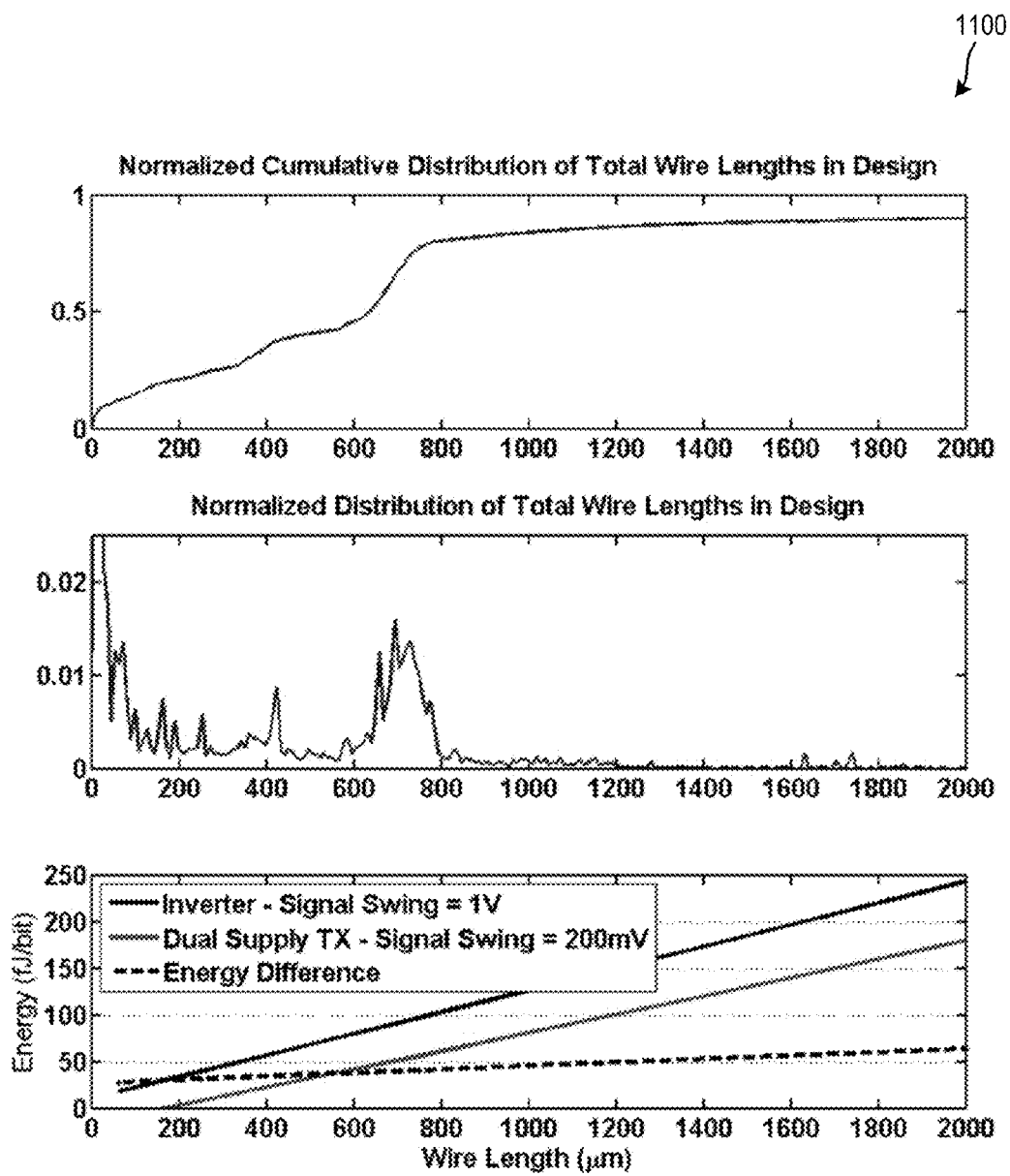
FIGS. 11 and 12 show exemplary report visualizations produced by a low-voltage swing evaluation.
Figure 12:
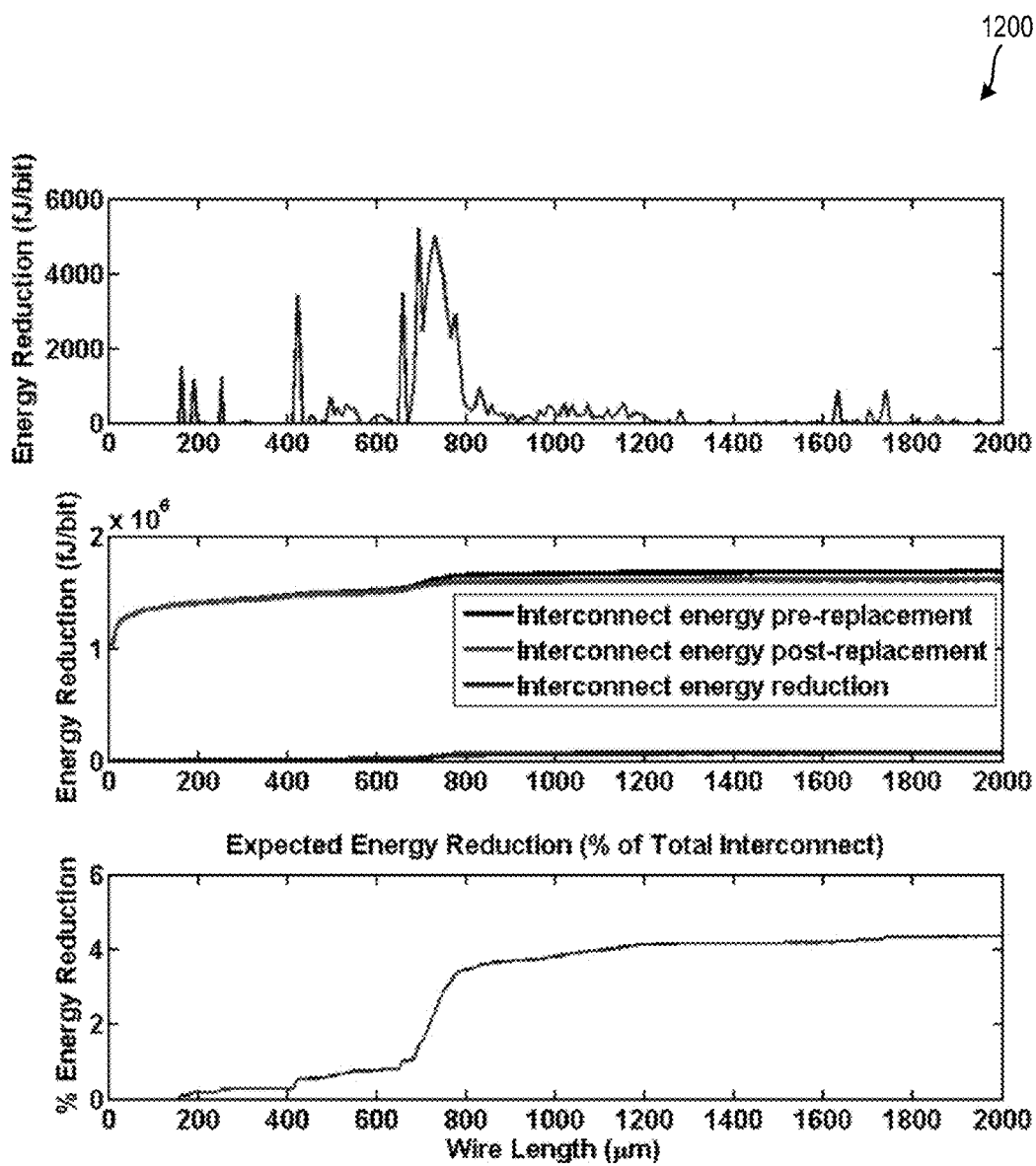

In addition to comprising textual and numerical reports of the effects of implementing an LVS modification, the evaluation reports produced by a low-voltage swing evaluation can comprise graphical reports, such as those shown in FIGS. 11 and 12, that can aid in evaluation of LVS modifications. Visualization of the effects of design changes can provide a designer with useful information to make informed decisions about what design changes should be implemented based on the timing, area, energy and/or interconnect characteristics of a particular design. FIG. 11 shows visualizations that show the distribution of interconnect lengths in a design and FIG. 12 shows visualizations that illustrate energy consumption as a function of interconnect length in the design. Other visualizations can illustrate the impact of LVS modifications on power consumption and timing arcs in the design as a function of wire length. Comparing visualizations of design characteristics of the initial design with the resulting characteristics after changes to the design are applied can allow a designer to quickly evaluate the effects of LVS modifications to the design and make decisions on how to best optimize the area, timing and/or energy components of the on-chip wires.

The LVS modifications to be implemented in a design can be selected from among the candidate LVS modifications automatically by, for example, an EDA tool, or manually, by a designer. For example, automatic selection can be based on whether a candidate LVS modification provides an improvement in a design characteristic with or without regard to other design characteristics. For instance, candidate LVS modifications can be selected based on whether they improve a timing, energy, power and/or other characteristic improvement that exceed a certain threshold without regard to area, or whether they provide such an improvement and have an area cost below a certain threshold. Threshold can be a relative threshold (the timing of a specific signal or path improves by more than X %) or an absolute threshold (the timing speeds up by at least X ns).

Candidate LVS modifications can be selected for implementation that achieve desired improvement in design characteristics. For example, candidate LVS modifications can be selected that achieve a desired energy reduction, timing improvements or a combination thereof. Candidate LVS modifications can be selected for implementation that achieve an improvement in one or more design characteristics at the cost of one or more design characteristics. For example, LVS modifications can be selected for implementation based on allowable trade-offs between timing energy and timing improvements, as specified in user specifications 320 (e.g., as specification in a modification profile). Trade-offs can also be specified by designer feedback 390, which a designer can provide after reviewing evaluation reports 370.

In order for changes that are recommended by the tool or selected by the user to be implemented in the original design, new design files are created by embodiments of the technologies described herein. In a first exemplary method of implementing selected LVS modifications, a list of engineering change order (ECO) commands are supplied to the place and route tool and the place and route process 394 is performed. The ECO commands can be automatically generated as part of the design flow (e.g., by the low-voltage swing evaluation 330 in the design flow 300.) For example, a script can be automatically generated comprising ECO commands, such as delete cell A, add cell B, attach node M to cell B pin Z, etc., and the script can be run by the place and route tool that is part of a design flow. A summary of one embodiment of a place and route process executing ECO commands is as follows. A saved version of the original design is loaded by a computing device executing a place and route software application. Cells and nets from the original design identified and marked for replacement are deleted from the design. The location of cells that are to be removed is recorded so that when the new LVS cells are placed they can be placed near the location of the original cell that they are replacing. Fill cells, clock routing and design routing can be modified or removed in the original design to accommodate placement of and routing to the low-voltage swing link wires, and to make such placement and routing easier. The LVS cells, nets and their connections are then added to the design. New LVS cells are placed near the location of the original cell that they are replacing or being attached to in the same module floorplan area as the original cell. Single-ended or differential routing, depending on the type of LVS cells being utilized, is then performed for the new LVS cells and net connections. If further routing is required, such as in a case where routing information is removed at the beginning of the cell replacement process, the new low-voltage swing wires can be marked such that the placement and routing tool will not modify them during the rest of its run. That is, the LVS nets can be marked as "don't touch" nets for the remainder of the place and route run.

The ECO-based method can involve less designer-guided control of the LVS cell insertion/replacement process, but can produce ECO commands that are specific to a particular place and route tool used to generate the original design (the place route tool used in the place and route process 120). Thus, the ECO method involves tighter integration with a specific tool than the method described in the following section.

A second exemplary method for implementing selected LVS modifications to a design is to create a new netlist of the design that includes the new low-voltage swing cells and low-voltage swing net connections. This method can involve less integration with the place and route tool used for the original design, but can involve additional guidance inputs from the designer to the place and route tool to address changes to the design floorplan to accommodate a change in module area due to the addition of new cells and/or the removal of conventional cells.

In both of the above exemplary methods for implementing LVS modification, an additional routing task can be performed if differential signaling is used to implement LVS nets. During these additional routing steps, the low-voltage swing nets can be routed prior to the rest of the conventional nets (nets that carry digital signals). Design rules can be applied to the physical design to ensure sufficient signal integrity for the differential signals, such as design rules related to signal shielding, differential wire twisting, and limits on the allowable length of and distance to parallel wires.

Although the technologies described herein have been described in the context of implementing LVS modifications to CMOS designs, it can be appreciated that the technologies can be extended to other types of digital designs, such as bipolar designs. For example, the disclosed technologies could be utilized to implement low-voltage swing BJT (bipolar junction transistor) signaling drivers and receivers in a digital bipolar design by selectively replacing BJTs gates and nets with low-voltage swing BJT cells and nets to improve design performance.

The utility of the technologies described herein include automation of the process of inserting LVS cells into a circuit design, and replacing existing cells with LVS cells in a circuit design, such as a CMOS very large scale integration (VLSI) design, which would otherwise involve considerable manual effort. The large manual effort involved in implementing low-voltage swing signaling typically results in LVS signaling being applied to long and potentially obvious wires. This can result in many shorter wires being left to operate at full voltage swing digital signal levels, wasting energy and reducing performance due to the difficulty in applying low-voltage swing signaling techniques within the existing design flow. The automation of LVS cell insertion and replacement can thus result in LVS signaling being applied to a greater number of wires, thereby resulting in further energy, power, and timing improvements in the original design.

Figure 13:
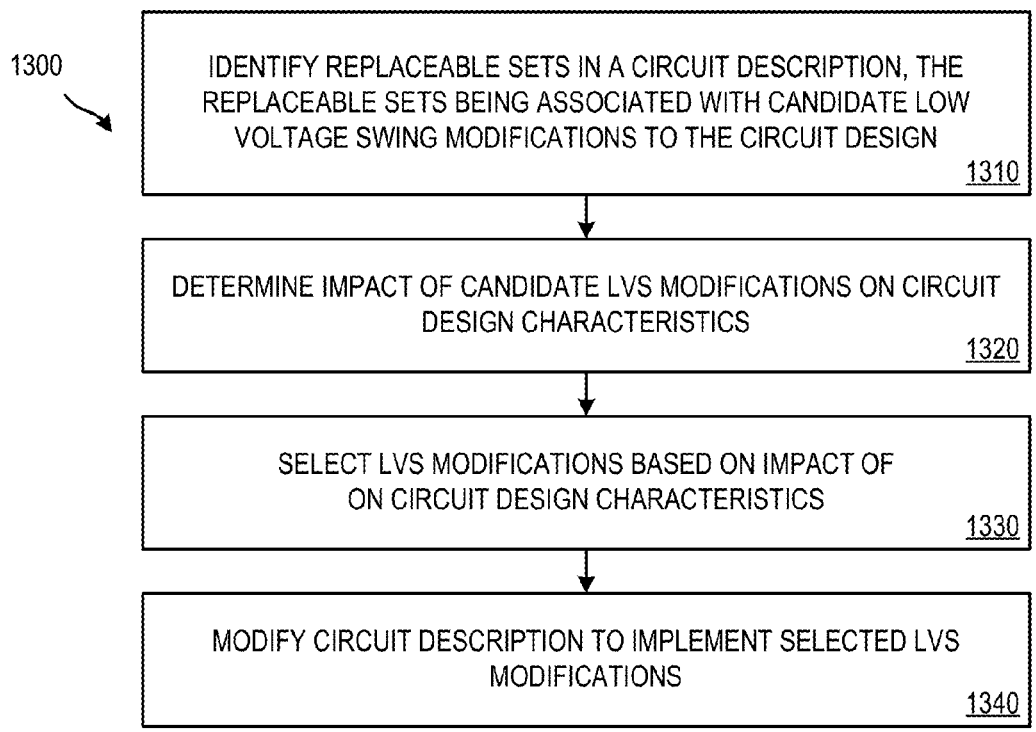
FIG. 13 is an exemplary method of modifying a circuit design to incorporate low-voltage swing circuitry.

FIG. 13 is an exemplary computer-implemented method 1300 of modifying a circuit design to incorporate low-voltage swing circuitry. The method 1300 can be performed, by, for example, a workstation executing EDA software identifying and analyzing possible LVS modifications that can be made in a microprocessor design. In a process act 1310, one or more replaceable sets in a circuit description of a circuit design are automatically identified. Respective ones of the replaceable sets are associated with one or more candidate low-voltage swing (LVS) modifications to the circuit design. In this example, the workstation identifies a number of replaceable sets in a netlist of a CMOS digital design of a microprocessor. The replaceable sets are associated with candidate LVS modifications to the microprocessor. Some of the candidate LVS modifications comprise replacing both driver and receiver cells of a replaceable net, and some of the candidate LVS modifications comprise replacing the receiver cells and inserting an LVS driver cell to the output of the driver cell.

In a process act 1320, the impact of implementing the one or more candidate LVS modifications on one or more characteristics of the circuit design are determined. In the example, the workstation analyzes the impact on the design area and timings resulting from implementation of the candidate LVS modifications. Analyzing the area impact comprises estimating a change in the area of the microprocessor and analyzing the timing impact comprises internal signals in the microprocessor design based on the implementing the candidate LVS modifications individually. The workstation generates a report showing timing improvement of internal microprocessor signals, ranked by the relative improvement in timing, and the associated impact on microprocessor area.

In a process act 1330, at least one selected LVS modification from the one or more candidate LVS modifications is selected based at least in part on the impact of the one or more candidate LVS modifications on the one or more characteristics of the circuit design. In the example, the workstation selects the candidate LVS modifications resulting in a timing improvement of 10% of an internal signal and that result in an increase in area of less than 1%.

In a process act 1340, the circuit description of the circuit design is modified to implement the at least one selected LVS modification. In the example, the workstation modifies the netlist, physical design (layout) and behavioral (Verilog) files to implement the selected LVS modifications.

The execution of the various electronic design automation processes according to embodiments of the disclosed technology can be implemented using computer-executable software instructions executed by one or more programmable computing devices, such as a server, workstation, desktop, laptop or tablet computer. Because these embodiments of the disclosed technology can be implemented using software instructions, the components and operation of a generic programmable computer system on which various embodiments of the disclosed technology can be employed are described. Further, because of the complexity of some electronic design automation processes and the large size of many circuit designs, various electronic design automation tools are configured to operate on a computing system capable of simultaneously running multiple processing threads. The components and operation of a computer network having a host or master computer and one or more remote or servant computers therefore will be described with reference to FIG. 14. This operating environment is only one example of a suitable operating environment, however, and is not intended to suggest any limitation as to the scope of use or functionality of the disclosed technology.

Figure 14:
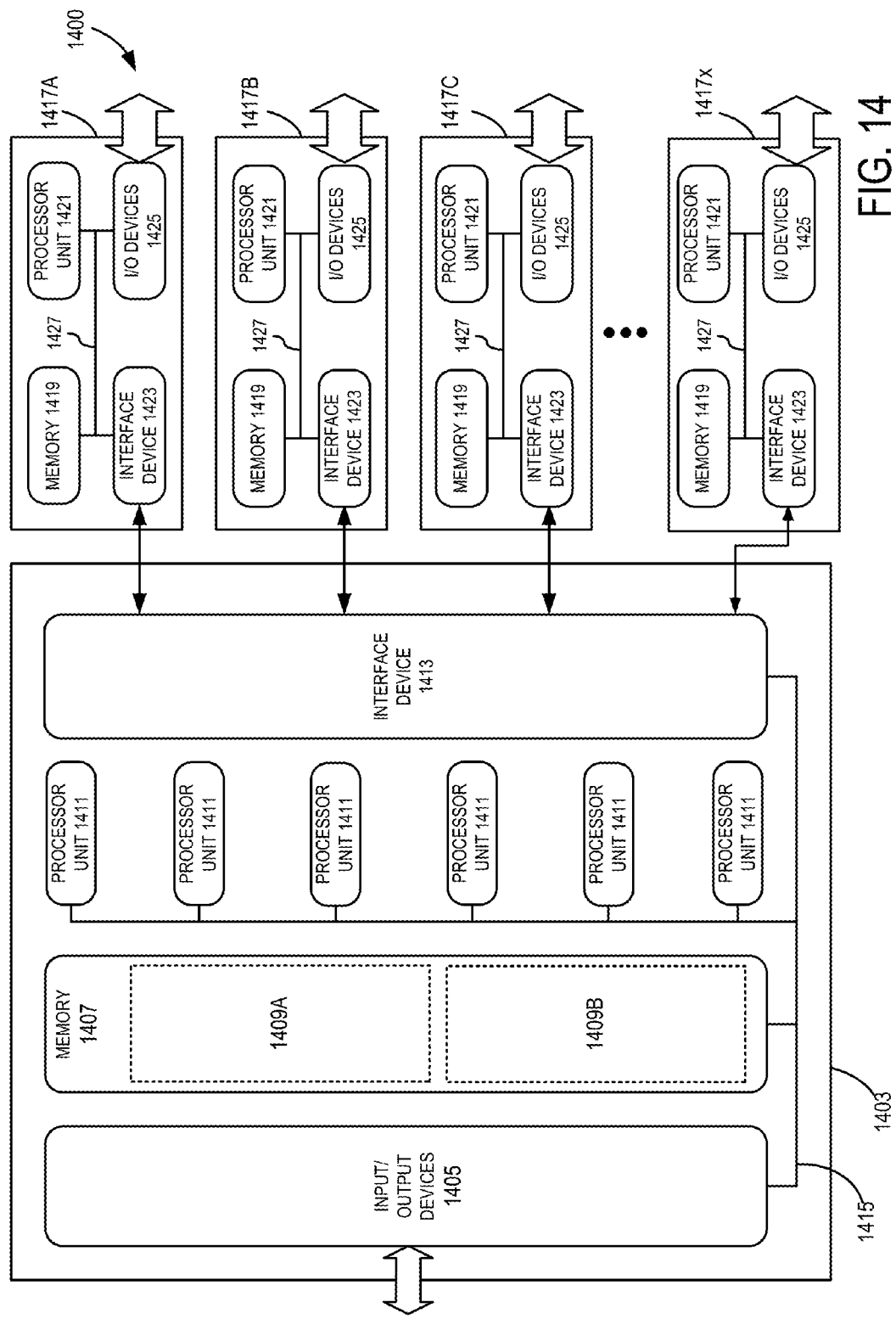
FIG. 14 is a block diagram illustrating an exemplary computer network suitable for performing embodiments of the disclosed technology.

In FIG. 14, the computer network 1400 includes a master computer 1403. In the illustrated example, the master computer 1403 is a multi-processor computer that includes a plurality of input and output devices 1405 and a memory 1407. The input and output devices 1405 may include any device for receiving input data from or providing output data to a user. The input devices may include, for example, a keyboard, touch screen, microphone, scanner or pointing device for receiving input from a user. The output devices may include a display monitor, speaker, printer or tactile feedback device. These devices and their connections are well known in the art, and thus will not be discussed at length here.

The memory 1407 may similarly be implemented using any combination of computer readable storage media that can be accessed by the master computer 1403. The computer readable storage media may include, for example, memory devices such as read-write memory ("RAM"), read-only memory ("ROM"), electronically erasable and programmable read-only memory ("EEPROM"), flash memory devices, CD-ROM disks, digital video disks ("DVD"), or other optical storage devices. The computer readable storage media may also include magnetic cassettes, hard drives, magnetic tapes, magnetic disks, or other magnetic storage devices, holographic storage devices, or any other storage medium that can be used to store desired information. The memory 1407 can be used for storing data and/or computer-executable instructions that cause a computing device to perform the methods described herein on the master computer 1403. The computer-readable storage media included in the memory 1407 is non-transitory and does not include propagated signals.

As will be discussed in detail below, the master computer 1403 runs a software application for performing one or more operations according to any of the examples disclosed herein. Accordingly, the memory 1407 stores software instructions 1409A that, when executed, will implement a software application for performing one or more operations. The memory 1407 also stores data 1409B to be used with the software application. In the illustrated embodiment, the data 1409B contains process data that the software application uses to perform the operations, at least some of which may be parallel.

The master computer 1403 also includes one or more processor units 1411 and an interface device 1413. The processor units 1411 can be any type of processor device that can be programmed to execute the software instructions 1409A, but will ordinarily be a microprocessor device. Alternately or additionally, one or more of the processor units 1411 may be a custom-manufactured processor, such as a microprocessor designed to optimally perform specific types of mathematical operations. The interface device 1413, the processor units 1411, the memory 1407 and the input/output devices 1405 are connected together by a bus 1415.

Figure 15:
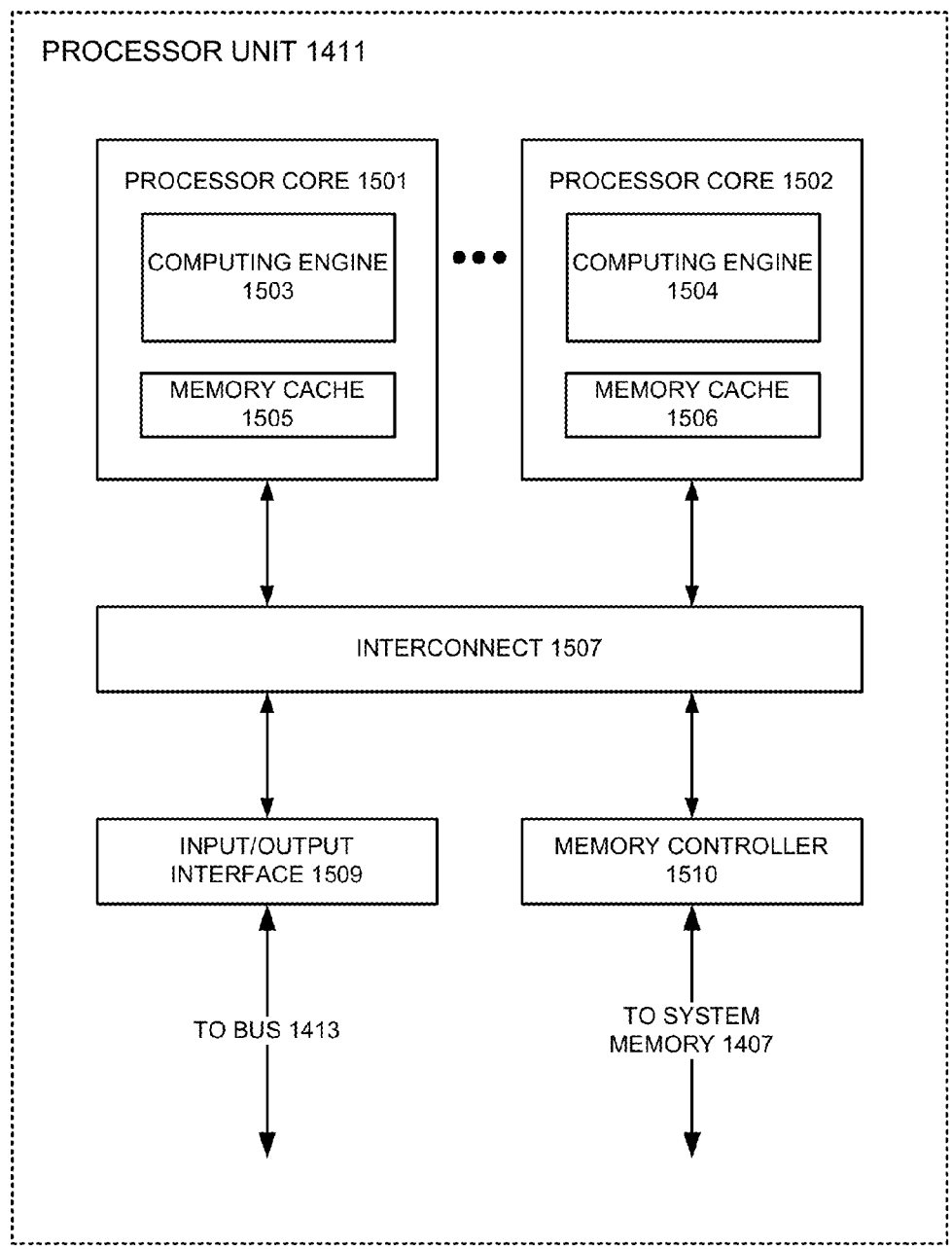
FIG. 15 is a block diagram illustrating an exemplary processing unit that can be used as part of the computer network shown in FIG. 14.

With some implementations of the disclosed technologies, the master computing device 1403 may employ one or more processing units 1411 having more than one processor core. Accordingly, FIG. 15 illustrates an example of a multi-core processor unit 1411 that may be employed with various embodiments of the disclosed technology. As seen in this figure, the processor unit 1411 includes a plurality of processor cores 1501, 1502. Each processor core 1501, 1502 includes a respective computing engine 1503, 1504 and a respective memory cache 1505, 1506. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 1503 may then use its corresponding memory cache 1505 to quickly store and retrieve data and/or instructions for execution.

Each of the processor cores 1501, 1502 is connected to an interconnect 1507. The particular construction of the interconnect 1507 may vary depending upon the architecture of the processor unit 1501. The interconnect 1507 may be implemented as, for example, an interconnect bus or as a system request interface device. In any case, the processor cores 1501, 1502 communicate through the interconnect 1507 with an input/output interface 1509 and a memory controller 1510. The input/output interface 1509 provides a communication interface between the processor cores 1501, 1502 and the bus 1415. Similarly, the memory controller 1510 controls the exchange of information between the processor cores 1501, 1502 and the system memory 1407. With some implementations of the disclosed technology, each of the processor cores 1501, 1502 may include additional components, such as a high-level cache memory, which may be shared by the processor cores 1501, 1502. While FIG. 15 shows one illustration of a processor unit 1411 that may be employed by some embodiments of the disclosed technology, it should be appreciated that this illustration is representative only, and is not intended to be limiting.

It also should be appreciated that, with some implementations, multiple separate processor units can be used in lieu of a multi-core processor unit. Furthermore, an alternate implementation of the disclosed technology may employ a single processor unit having six cores, two multi-core processor units each having three cores, a multi-core processor unit with four cores together with two separate single-core processor units, and so on.

Returning now to FIG. 14, the interface device 1413 allows the master computer 1403 to communicate with the servant computers 1417A, 1417B, 1417C . . . 1417x through a communication interface. The communication interface can be any suitable type of interface including, for example, a wired network connection or an optically transmissive-wired network connection. The communication interface can also be a wireless connection, such as a wireless optical connection, a radio frequency connection, an infrared connection, or even an acoustic connection. The interface device 1413 translates data and control signals from the master computer 1403 and each of the servant computers 1417 into network messages according to one or more communication protocols, such as the transmission control protocol ("TCP"), the user datagram protocol ("UDP"), or the Internet protocol ("IP"). These and other communication protocols are well known in the art, and thus will not be discussed here in more detail.

Each servant computer 1417 can include a memory 1419, a processor unit 1421, an interface device 1423, and, optionally, one more input/output devices 1425 connected together by a system bus 1427. As with the master computer 1403, the optional input/output devices 1425 for the servant computers 1417 can include any input or output devices, such as keyboards, touch screens, pointing devices, microphones, display monitors, speakers, and printers. Similarly, the processor units 1421 can be any type of general processing device or custom-manufactured programmable processor device. Alternately, one or more of the processor units 1421 can be custom-manufactured processors, such as microprocessors designed to optimally perform specific types of mathematical operations. Still further, one or more of the processor units 1421 can have more than one core, as described with reference to FIG. 15 above. For example, with some implementations of the disclosed technology, one or more of the processor units 1421 can be a Cell processor. The memory 1419 then can be implemented using any combination of the computer readable media discussed above. Like the interface device 1413, the interface devices 1423 allow the servant computers 1417 to communicate with the master computer 1403 over the communication interface.

In the illustrated example, the master computer 1403 is a multi-processor unit computer with multiple processor units 1411, while each servant computer 1417 has a single processor unit 1421. It should be noted, however, that alternate implementations of the disclosed technology can employ a master computer having single processor unit 1411. Further, one or more of the servant computers 1417 can have multiple processor units 1421, depending upon their intended use, as previously discussed. Also, while only a single interface device 1413 or 1423 is illustrated for both the master computer 1403 and the servant computers, it should be noted that, with alternate embodiments of the disclosed technology, either the computer 1403, one or more of the servant computers 1417, or some combination of both may use two or more different interface devices 1413 or 1423 for communicating over multiple communication interfaces.

With various examples of the disclosed technology, the master computer 1403 can be connected to one or more external data storage devices. These external data storage devices can be implemented using any combination of computer readable storage media that can be accessed by the master computer 1403. The computer readable storage media can include, for example, memory devices such as read-write memory ("RAM"), read-only memory ("ROM"), electronically erasable and programmable read-only memory ("EEPROM") or flash memory devices, CD-ROM disks, digital video disks ("DVD"), or other optical storage devices. The computer readable storage media may also include magnetic cassettes, magnetic tapes, magnetic disks, hard drives or other magnetic storage devices, punched media, holographic storage devices, or any other tangible medium that can be used to store desired information. The computer-readable storage media included in the external data storage is non-transitory and does not include propagated signals. According to some implementations of the disclosed technology, one or more of the servant computers 1417 can alternately or additionally be connected to one or more external data storage devices. Typically, these external data storage devices will include data storage devices that also are connected to the master computer 1403, but they also can be different from any data storage devices accessible by the master computer 1403.

It also should be appreciated that the description of the computer network illustrated in FIG. 14 and FIG. 15 is provided as an example only and is not intended to suggest any limitation as to the scope of use or functionality of alternate embodiments of the disclosed technology. For example, any of the embodiments of the disclosed technology can be implemented on a single computer having a single processor.

Figure 16:
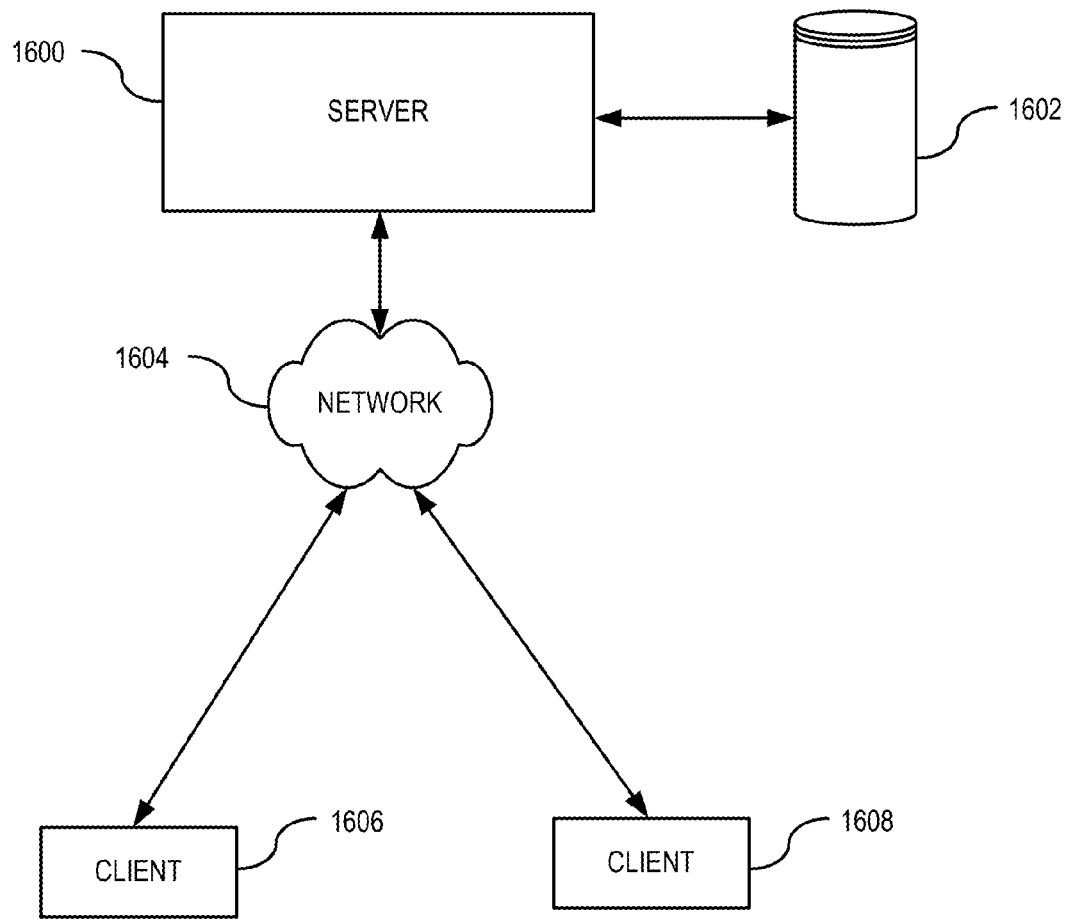
FIG. 16 is a block diagram illustrating a computer network that can be used to perform any of the embodiments of the disclosed technology.

Any of the aspects of the technology described above may be performed using a distributed computer network, such as the computing environment described above with respect to FIG. 14. FIG. 16 shows a simplified embodiment of one such exemplary network. A server computer 1600 can have an associated storage device 1602 (internal or external to the server computer). For example, the server computer 1600 can be configured to perform the low-voltage swing circuit modifications according to any of the disclosed embodiments (e.g., as part of an EDA software tool). The server computer 1600 can be coupled to a network, shown generally at 1604, which can comprise, for example, a wide-area network, a local-area network, a client-server network, the Internet, or other such network. One or more client computers, such as those shown at 1606, 1608, may be coupled to the network 1604 using a network protocol. The work may also be performed on a single, dedicated workstation, which has its own memory and one or more CPUs.

Figure 17:
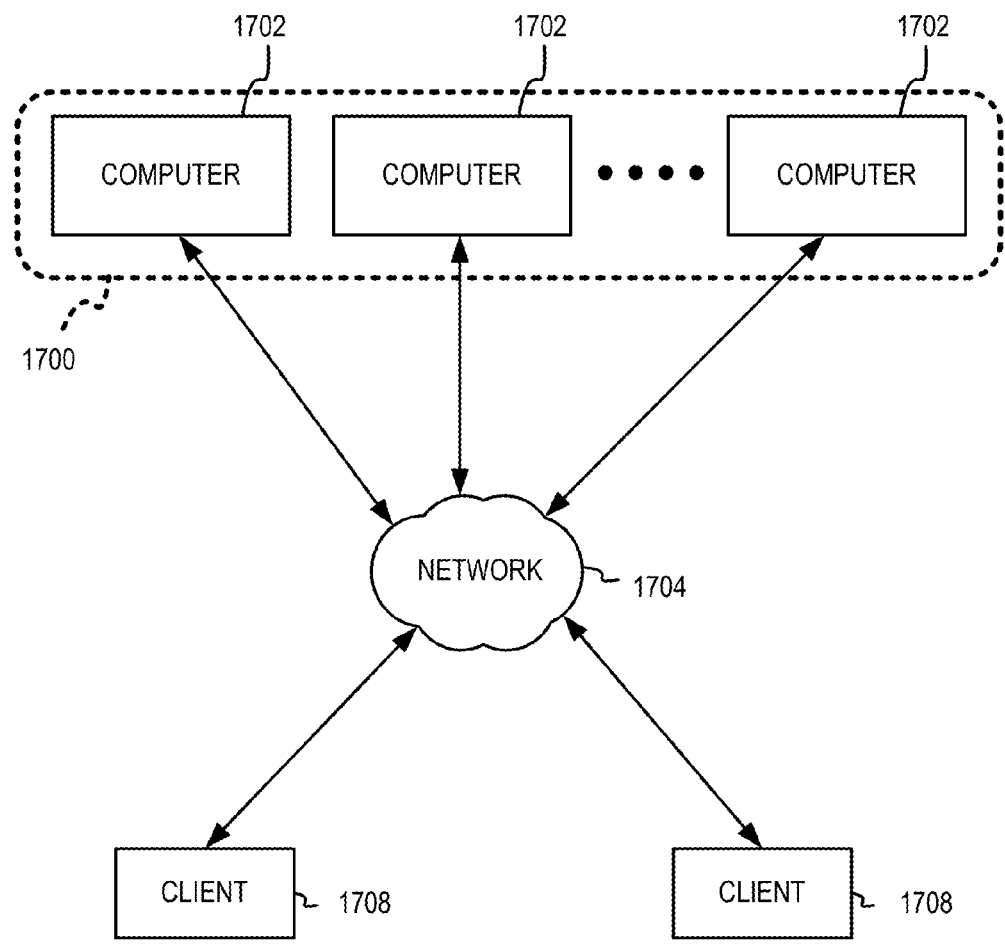
FIG. 17 is a block diagram illustrating another computer network that can be used to perform any of the embodiments of the disclosed technology.

FIG. 17 shows another exemplary network. One or more computers 1702 communicate via a network 1704 and form a computing environment 1700 (e.g., a distributed computing environment). Each of the computers 1702 in the computing environment 1700 can be used to perform at least a portion of the low-voltage swing circuit modifications according to any of the disclosed embodiments (e.g., as part of an EDA software tool). The network 1704 in the illustrated embodiment is also coupled to one or more client computers 1708.

For clarity, only certain selected aspects of the software-based implementations are described. Other details that are well known in the art are omitted. For example, it is to be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, and infrared communications), electronic communications, or other such communication means.

The disclosed methods can also be implemented by specialized computing hardware that is configured to perform any of the disclosed methods. For example, the disclosed methods can be implemented (entirely or at least in part) by an integrated circuit (e.g., an application specific integrated circuit ("ASIC") or programmable logic device ("PLD"), such as a field programmable gate array ("FPGA")). The integrated circuit can be embedded in or directly coupled to a computing device configured to analyze LVS modifications to an IC design.

The various methods disclosed herein can also be described in the general context of computer-executable instructions, such as those included in program modules, being executed in a computing environment by a processor. Generally, program modules include routines, programs, libraries, objects, classes, components, data structures, and so on, that perform particular tasks or implement particular abstract data types. The functionality of the program modules may be combined or split between program modules as desired in various embodiments. Computer-executable instructions for program modules may be executed within a local or distributed computing environment.

As used in this application and in the claims, the singular forms "a," "an," and "the" include the plural forms unless the context clearly dictates otherwise. The term "comprising" means "including;" hence, "comprising A or B" means including A or B, as well as A and B together. Additionally, the term "includes" means "comprises." Additionally, as used herein, the term "and/or" means any one item or combination of any items in the phrase.

The disclosed methods, apparatuses, and systems should not be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved. Furthermore, any features or aspects of the disclosed embodiments can be used in various combinations and subcombinations with one another. For example, one or more method acts from one embodiment can be used with one or more method acts from another embodiment and vice versa.

Although the operations of some of the disclosed methods are described in a particular, sequential order for convenient presentation, it should be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

Having illustrated and described the principles of the illustrated embodiments, the embodiments can be modified in various arrangements while remaining faithful to the concepts described above. In view of the many possible embodiments to which the principles of the illustrated embodiments may be applied, it should be recognized that the illustrated embodiments are only examples and should not be taken as limiting the scope of the disclosure. We claim all that comes within the scope of the appended claims.

We claim:

1. A computer-implemented method of modifying a circuit design, comprising:
   by a computer, identifying one or more replaceable sets in a description of a circuit design, respective ones of the replaceable sets being associated with one or more candidate low-voltage swing (LVS) modifications to the circuit design;
   by the computer, determining the impact of implementing the one or more candidate LVS modifications on one or more characteristics of the circuit design;
   by the computer, selecting at least one selected LVS modification from the one or more candidate LVS modifications based at least in part on the impact of the one or more candidate LVS modifications on the one or more characteristics of the circuit design; and
   by the computer, modifying the description of the circuit design to implement the at least one selected LVS modification.

2. The computer-implemented method of claim 1, wherein the circuit design is a CMOS circuit design.

3. The computer-implemented method of claim 1, wherein at least one of the one or more candidate LVS modifications are associated with a driver cell and one or more receiver cells driven directly or indirectly by the driver cell, and wherein at least one of the one or more candidate LVS modifications comprises replacing the one or more receiver cells with one or more low-voltage swing receiver cells.

4. The computer-implemented method of claim 1, wherein at least one of the one or more candidate LVS modifications are associated with a driver cell and one or more receiver cells driven directly or indirectly by the driver cell and wherein at least one of the one or more candidate LVS modifications comprises replacing the driver cell with a low-voltage swing driver cell.

5. The computer-implemented method of claim 1, wherein at least one of the one or more candidate LVS modifications are associated with a driver cell and one or more receiver cells driven directly or indirectly by the driver cell and wherein at least one of the one or more candidate LVS modifications comprises inserting a low-voltage swing driver cell between the driver cell and the net being driven by the driver cell.

6. The computer-implemented method of claim 1, wherein at least one of the one or more candidate LVS modifications are associated with a driver cell and one or more receiver cells driven directly or indirectly by the driver cell and wherein at least one of the one or more candidate LVS modifications comprises inserting a low-voltage swing receiver cell before one of the one or more receiver cells.

7. The computer-implemented method of claim 1, wherein the one or more candidate LVS modifications comprise replacing digital standard cells with low-voltage swing standard cells.

8. The computer-implemented method of claim 1, wherein the one or more candidate LVS modifications comprise the insertion of low-voltage swing standard cells.

9. The computer-implemented method of claim 1, wherein the at least one selected LVS modification satisfies one or more user-specified design constraints.

10. The computer-implemented method of claim 9, wherein the one or more user-specified design constraints comprise at least one of an energy constraint, a timing constraint, an area constraint or a power constraint.

11. The computer-implemented method of claim 1, wherein the at least one selected LVS modification is selected in accordance with a modification profile.

12. The computer-implemented method of claim 11, wherein the modification profile specifies a priority for the impact of implementing LVS modifications on circuit characteristics.

13. The computer-implemented method of claim 11, wherein the modification profile specifies allowable tradeoffs between circuit characteristics.

14. The computer-implemented method of claim 1, wherein the identifying comprises identifying as one of the replaceable sets a net, a replaceable driver driving the net, one or more replaceable receiver cells having an input pin connected to the net, and one or more non-replaceable receiver cells having an input pin connected to the net; the candidate LVS modification associated with the one of the replaceable sets comprising:
    splitting the net into a first net and a second net;
    connecting the first net to the output of the driver cell, an input pin of the one or more non-replaceable receiver cells and the input of an inserted buffer or inverter; and
    connecting the second net to the output of the inserted buffer or inverter and an input pin of the one or more replaceable receiver cells.

15. The computer-implemented method of claim 1, wherein the description comprises a netlist, the identifying comprising:
    identifying a path in the netlist comprising a top parent net having one or more descendant nets connected to the top parent net by one or more inverters or buffers;
    identifying at least one of the one or more descendent nets that are replaceable, have one or more replaceable child nets, and do not have non-replaceable child nets; and
    assigning the identified at least one of the replaceable descendent nets and their one or more replaceable child nets to one of the one or more replaceable sets,
    wherein the LVS modification associated with the one replaceable set comprises removing at least one of the one or more inverters or buffers.

16. The computer-implemented method of claim 1, wherein the description comprises one or more netlists and the modifying comprises modifying the one or more netlists.

17. The computer-implemented method of claim 1, wherein the description comprises one or more physical design files and the modifying comprises modifying the one or more physical design files.

18. One or more non-transitory computer-readable media storing computer-executable instructions which when executed by a computer cause the computer to perform a method, the method comprising:
    by the computer, identifying one or more replaceable sets in a description of a circuit design, respective ones of the replaceable sets being associated with one or more candidate low-voltage swing (LVS) modifications to the circuit design;

by the computer, determining the impact of implementing the one or more candidate LVS modifications on one or more characteristics of the circuit design;

by the computer, selecting at least one selected LVS modification from the one or more candidate LVS modifications based at least in part on the impact of the one or more candidate LVS modifications on the one or more characteristics of the circuit design; and by the computer, modifying the description of the circuit design to implement the at least one selected LVS modification.

19. The one or more non-transitory computer-readable media of claim 18, wherein at least one of the one or more candidate LVS modifications are associated with a driver cell and one or more receiver cells driven directly or indirectly by the driver cell, and wherein at least one of the one or more candidate LVS modifications comprises replacing the one or more receiver cells or the driver cell with one or more low-voltage swing receiver cells.

20. The one or more non-transitory computer-readable media of claim 18, wherein at least one of the one or more candidate LVS modifications are associated with a driver cell and one or more receiver cells driven directly or indirectly by the driver cell and wherein at least one of the one or more candidate LVS modifications comprises inserting a low-voltage swing driver cell between the driver cell and the net being driven by the driver cell or inserting a low-voltage swing receiver cell before one of the one or more receiver cells.

* * * * *